US011236507B2

(12) United States Patent
Dicaire

(10) Patent No.: US 11,236,507 B2
(45) Date of Patent: Feb. 1, 2022

(54) STRUCTURAL TRUSS MODULE WITH FASTENER WEB AND MANUFACTURING METHOD THEREFOR

(71) Applicant: OMG, Inc., Agawam, MA (US)

(72) Inventor: Mark A. Dicaire, Northborough, MA (US)

(73) Assignee: OMG, Inc., Agawam, MA (US)

( * ) Notice: Subject to any disclaimer, the term of this patent is extended or adjusted under 35 U.S.C. 154(b) by 0 days.

(21) Appl. No.: 15/248,069

(22) Filed: Aug. 26, 2016

(65) Prior Publication Data

US 2017/0058526 A1 Mar. 2, 2017

Related U.S. Application Data

(60) Provisional application No. 62/210,026, filed on Aug. 26, 2015.

(51) Int. Cl.
*E04C 3/292* (2006.01)
*E04C 3/04* (2006.01)

(52) U.S. Cl.
CPC ...... *E04C 3/292* (2013.01); *E04C 2003/0452* (2013.01); *E04C 2003/0486* (2013.01)

(58) Field of Classification Search
CPC ............. E04C 3/292; E04C 2003/0413; E04C 2003/0452; E04B 2001/2418; F16B 25/0057; F16B 5/0275
USPC ... 52/693, 695, 126.7, 654.1, 846, 837, 838, 52/690; 411/412
See application file for complete search history.

(56) References Cited

U.S. PATENT DOCUMENTS

| 852,665 A | * | 5/1907 | Kellogg | 52/690 |
| 1,554,224 A | * | 9/1925 | McGrath | B64C 1/08 52/646 |
| 2,342,916 A | * | 2/1944 | Blaski | E04C 3/42 52/642 |
| 3,778,946 A | * | 12/1973 | Wood | E04C 3/18 52/223.8 |
| 3,961,455 A | * | 6/1976 | Peters | E04B 1/2612 52/693 |
| 4,069,635 A | * | 1/1978 | Gilb | E04C 3/292 52/693 |

(Continued)

FOREIGN PATENT DOCUMENTS

| AT | 10202497 A1 * 10/2002 | B27M 3/0046 |
| AT | 2256262 A1 * 12/2010 | E04B 1/10 |

(Continued)

OTHER PUBLICATIONS

EP 0448915 A1 English Translation (Year: 1991).*
Gunther Voss, Machine translation of Description of Patent Publication FR 865,513 A, May 9, 1940 (Year: 1940).*

*Primary Examiner* — Brent W Herring
(74) *Attorney, Agent, or Firm* — Alix, Yale & Ristas, LLP

(57) ABSTRACT

A structural truss module employs a fastener web to interconnect elongated wood chords. The web comprises a plurality of metal support rods. Each of the support rods has opposed threaded sections which are each threadably engaged to opposed chords preferably at an angle thereto. In one embodiment, a matrix of quasi-convergent adjacent pairs of support rods is employed. The structural truss modules may form part of a roof for a header or a structural wall.

30 Claims, 21 Drawing Sheets

(56) References Cited

U.S. PATENT DOCUMENTS

| | | | | |
|---|---|---|---|---|
| 4,653,244 | A * | 3/1987 | Farrell | E04F 13/0837 411/399 |
| 4,819,400 | A * | 4/1989 | Kindberg | E04C 3/292 52/693 |
| 5,301,487 | A * | 4/1994 | Wiebe | E04B 1/26 52/742.12 |
| 5,644,888 | A * | 7/1997 | Johnson | B29C 70/525 52/651.01 |
| 5,746,039 | A * | 5/1998 | Nystrom | E04C 3/04 411/387.1 |
| 5,816,012 | A * | 10/1998 | Willis | E04C 3/04 411/387.1 |
| 6,074,149 | A * | 6/2000 | Habermehl | F16B 25/0015 206/347 |
| 6,243,996 | B1 * | 6/2001 | Oliver | E04G 23/0218 248/200.1 |
| 6,325,583 | B1 * | 12/2001 | Mattle | E04B 5/12 411/387.6 |
| 7,150,132 | B2 * | 12/2006 | Commins | E04B 1/26 52/293.3 |
| 7,695,228 | B2 * | 4/2010 | Craven | F16B 5/0275 411/399 |
| 7,832,173 | B2 * | 11/2010 | Crawford | E04C 3/16 411/387.1 |
| 8,656,650 | B2 * | 2/2014 | Gray | E04B 1/2608 411/525 |
| 9,038,347 | B2 * | 5/2015 | Gundersen | E04C 3/292 52/636 |
| 2005/0252152 | A1 * | 11/2005 | Belinda | E04C 3/11 52/690 |
| 2006/0201581 | A1 * | 9/2006 | Belinda | F16B 5/0275 144/344 |
| 2008/0245030 | A1 * | 10/2008 | Sieber | E04B 2/707 52/782.1 |
| 2016/0194869 | A1 * | 7/2016 | Thornton | E04C 3/12 52/233 |

FOREIGN PATENT DOCUMENTS

| | | | |
|---|---|---|---|
| CH | 0448915 A1 * | 10/1991 | ............ E04B 7/22 |
| FR | 865513 A * | 5/1941 | ........... E04B 1/2604 |

\* cited by examiner

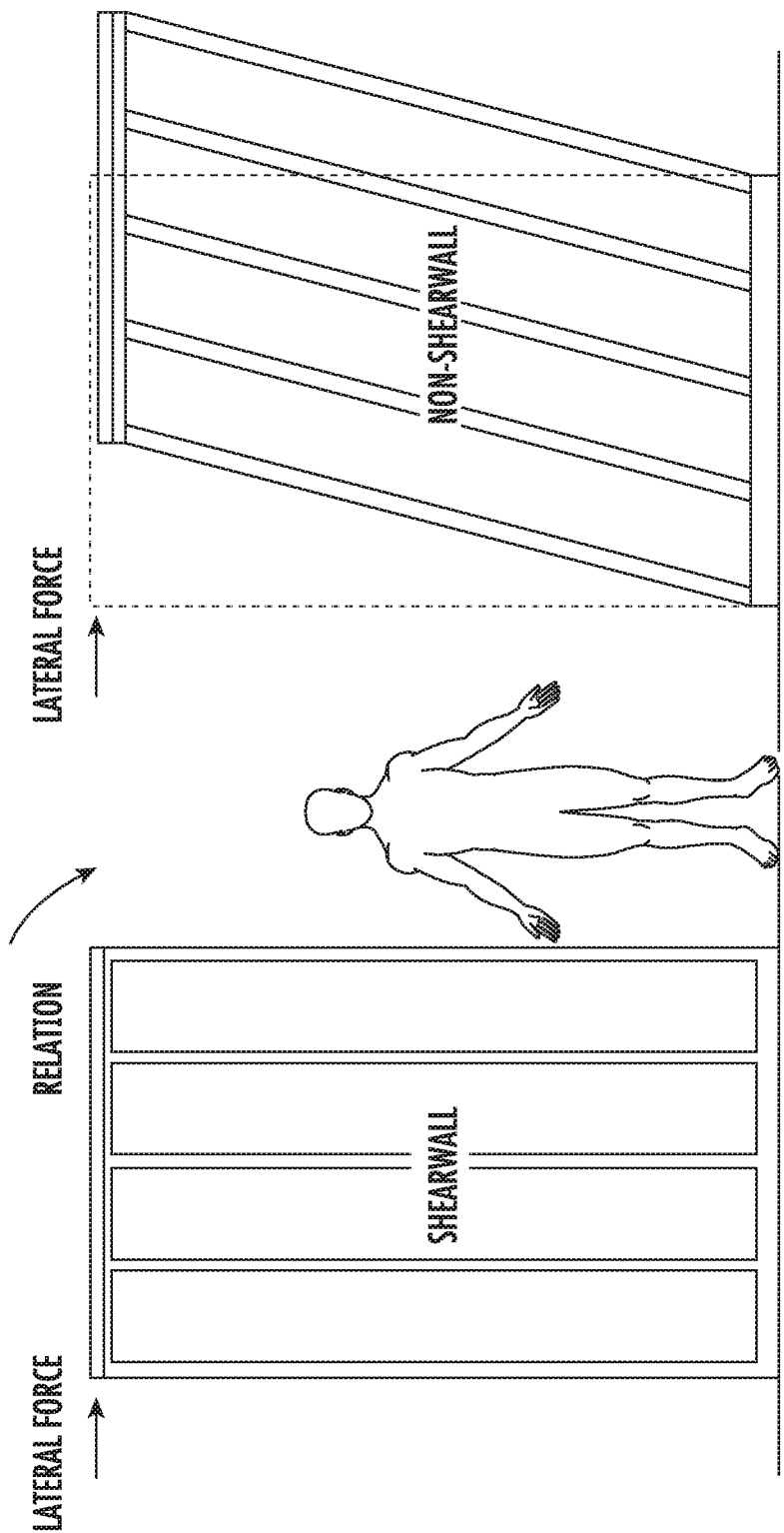

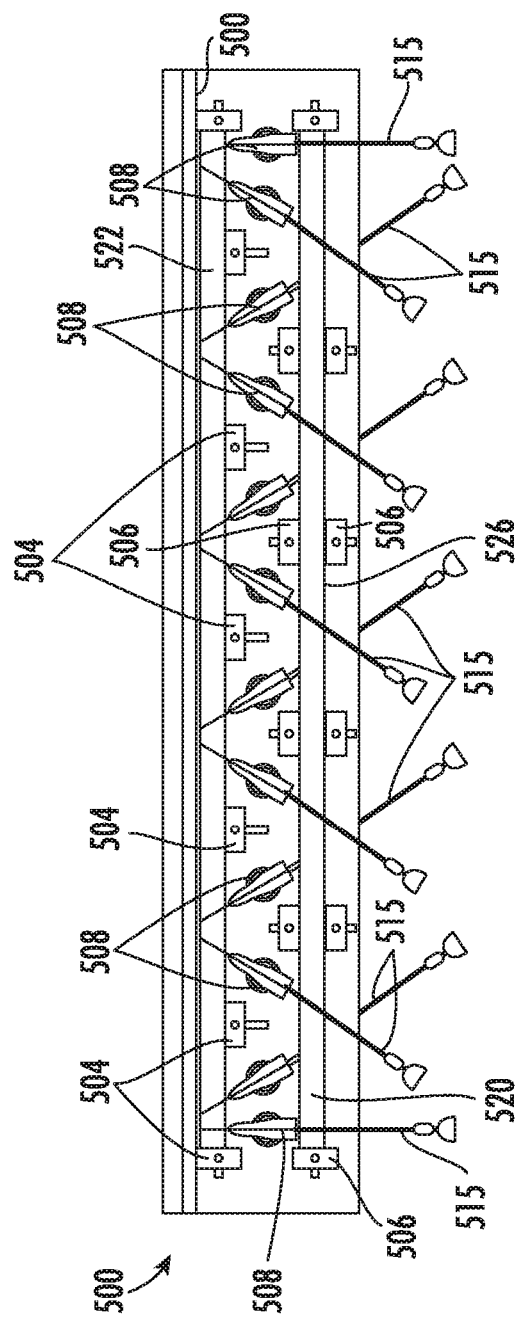
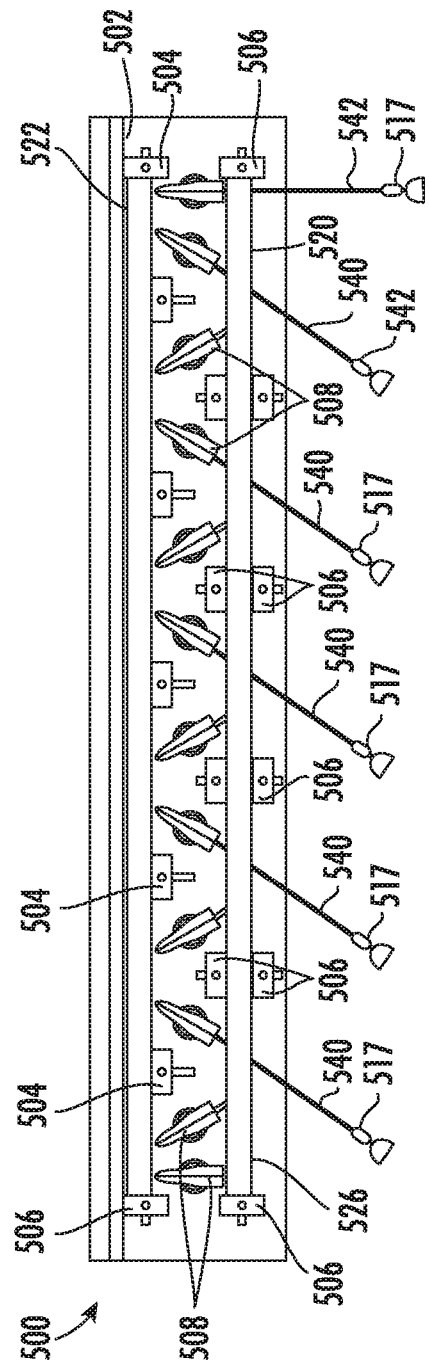
FIG. 19A
FIG. 19B

STRUCTURAL TRUSS MODULE WITH FASTENER WEB AND MANUFACTURING METHOD THEREFOR

CROSS-REFERENCE TO RELATED APPLICATION

This application claims priority of U.S. Provisional Patent Application No. 62/210,026 filed on Aug. 26, 2015, the disclosure of which is incorporated by reference herein in its entirety.

BACKGROUND

This disclosure relates generally to trusses employed in constructing residences and buildings. More particularly, this disclosure relates to reinforcement modules employed in the construction trades.

Conventional structural truss modules, to which the present disclosure relates, are exemplified in FIGS. 1A, 1B, 1C, 1D, 13A and 13B. The truss modules, which may have numerous applications, such as in connection with roofs, floors, headers, walls and other structures, are typically characterized by a pair of equidistantly spaced wood chords which are interconnected by a web principally composed of wood or wood-derived components. These conventional structural modules are characterized by the web occupying a significant portion of the space between the chords. This latter characteristic typically presents significant obstacles to the placement of longitudinally extending components, such as utility lines, in a location between the chords. The wood components naturally also have the same fire resistant qualities as the chords to which they connect.

SUMMARY

Briefly stated, a structural truss module in a preferred form comprises a spaced pair of generally parallel elongated support beams. A web connects the support beams. The web comprises a plurality of metal support rods each having a pair of opposed threaded sections. Each of the threaded sections is threadably engaged to an opposed beam at an angle to the beam.

Each beam has a transverse medial line and the rods generally engage each of the beams along the medial line. The web defines a matrix of quasi-convergent adjacent pairs of support rods. Each adjacent pair of support rods defines a substantially identical profile. The support beams are 2×3 wood chords, 2×4 wood chords or engineered wood components.

Each metal support rod preferably comprises an elongated screw having a head, a threaded portion adjacent the head, an intermediate unthreaded portion, a distal tip and a threaded portion adjacent the distal tip. Each metal support rod preferably has a drive head which is embedded in a support beam and preferably spaced from an edge of the support beam. In one embodiment, the structural truss module is employed in an integrated construction assembly as a roof truss or a floor truss. In another application, the structural truss module is employed as a shear panel in a vertical wall. The truss module may also be employed as a header in a construction assembly.

In one embodiment, the plurality of support rods further comprises a plurality of groups of multiple parallel support rods. The multiple parallel support rods for each group may be either two, three or four support rods.

A structural truss module comprises a pair of spaced generally parallel elongated wood chords. A web connects the chords. The web comprises a plurality of fasteners each having two spaced threaded sections, each threadably engaged to a wood chord at an angle thereto. The angle is preferably 45° or 90°. Each fastener has a drive head and a tip. Each head and tip is embedded in a chord a distance spaced from the outer edge of the chord. The distance is preferably one inch to 1.5 inches.

In one preferred embodiment, the structural truss module comprises a plurality of quasi-convergent pairs of fasteners. The web may also comprise multiple groups of parallel fasteners, such as groups of two, three or four fasteners.

A method of manufacturing a structural truss module comprising a first and a second chord comprises positioning the chord in a jig assembly wherein the chords are disposed in parallel spaced relationship. The method further comprises pre-drilling pilot bores through an edge of a first chord at longitudinally spaced locations along the chord. The method further comprises drivably installing a first set of fasteners through the first chord so that the fasteners threadably engage in the second chord and in the first chord and then drivably installing a second set of fasteners in the first chord so that the fasteners threadably engage in the second chord and threadably engage in the first chord. The chords and the installed fasteners are then removed from the jig assembly.

The manufacturing method further comprises driving the first set of fasteners and the second set of fasteners at different angles to the first chord. The fasteners are passed through a guide disposed between the first and second chords. The step of pre-drilling bores in the first chord further comprises pre-drilling pilot bores for installing the first set of fasteners at a first angle and subsequently pre-drilling pilot bores for a second set of fasteners at a second angle.

A method for manufacturing a structural truss module comprising a pair of chords comprises positioning the chords in a jig assembly wherein the chords are disposed in parallel spaced relationship. The first set of fasteners is driven through the first chord so that the fasteners threadably engage in the second chord and also threadably engage in the first chord. A second set of fasteners is then driven so that the fasteners threadably engage in the second chord and threadably engage in the first chord. The first and second chords and the installed fasteners are then removed from the jig assembly. The first set of fasteners is installed at a first angle and a second set of fasteners is installed at a second angle. The fasteners are passed through a guide disposed between the first and second chords. Pilot bores are preferably pre-drilled through an edge of the first chord at multiple angles at longitudinally spaced locations along the chord.

BRIEF DESCRIPTION OF THE DRAWINGS

FIG. 13A is a side elevational view, partly in schematic, of a prior art shear wall diagram;

FIG. 13B is a side elevational view of a prior art wall diagram illustrating non-shear characteristics upon an application of a lateral force;

FIG. 14 is a side elevational view of a shear wall incorporating installed shear panels comprising structural truss modules employing a web of fasteners;

FIGS. 19A-19D are annotated schematic views illustrating a representative manufacturing process for a representative structural truss module.

DETAILED DESCRIPTION

Figure 10:
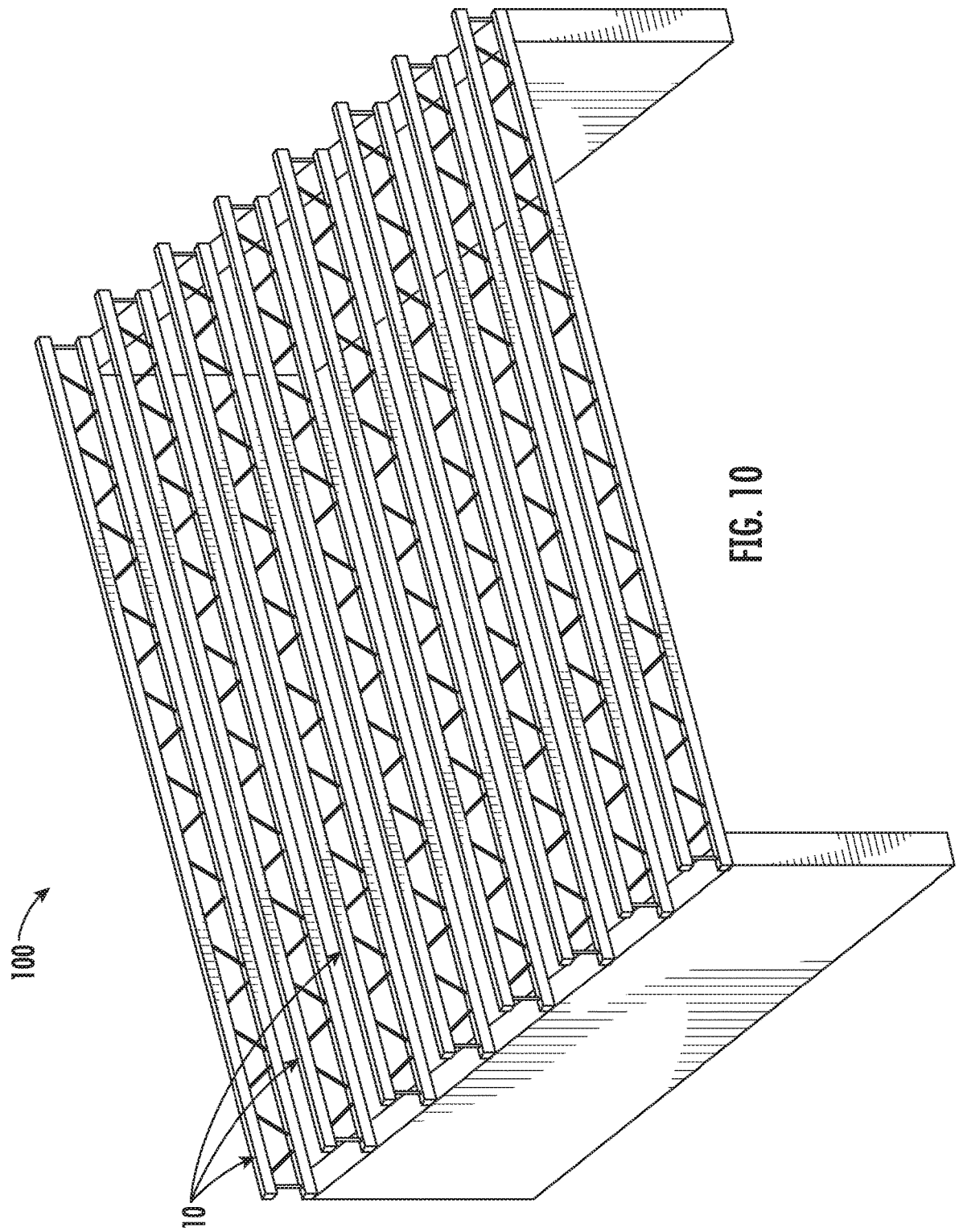
FIG. 10 is a perspective view illustrating a multiplicity of roof or floor truss modules installed on a pair of parallel support walls.

With reference to the drawings wherein like numerals represent like parts throughout the figures, a structural truss module is generally designated by the numeral 10. The structural truss module 10 can be constructed in a wide range of sizes and can provide a number of structural functions in an integrated construction, such as for a roof or floor truss assembly 100 illustrated in FIG. 10, a reinforced structural shear wall 200 illustrated in FIGS. 15 and 16 and a header structure for a wall 300 illustrated in FIGS. 17 and 18.

The structural roof or floor truss module 10 can be selectively configured in a number of standard heights H, such as 7¼, 9½, 11⅞, 14, 16 and 18 inches, and various lengths L as dictated by a given application. The structural truss module 10, in accordance with the present disclosure, allows for the ability to custom construct the module having specific dimensions as required.

Figure 1A:
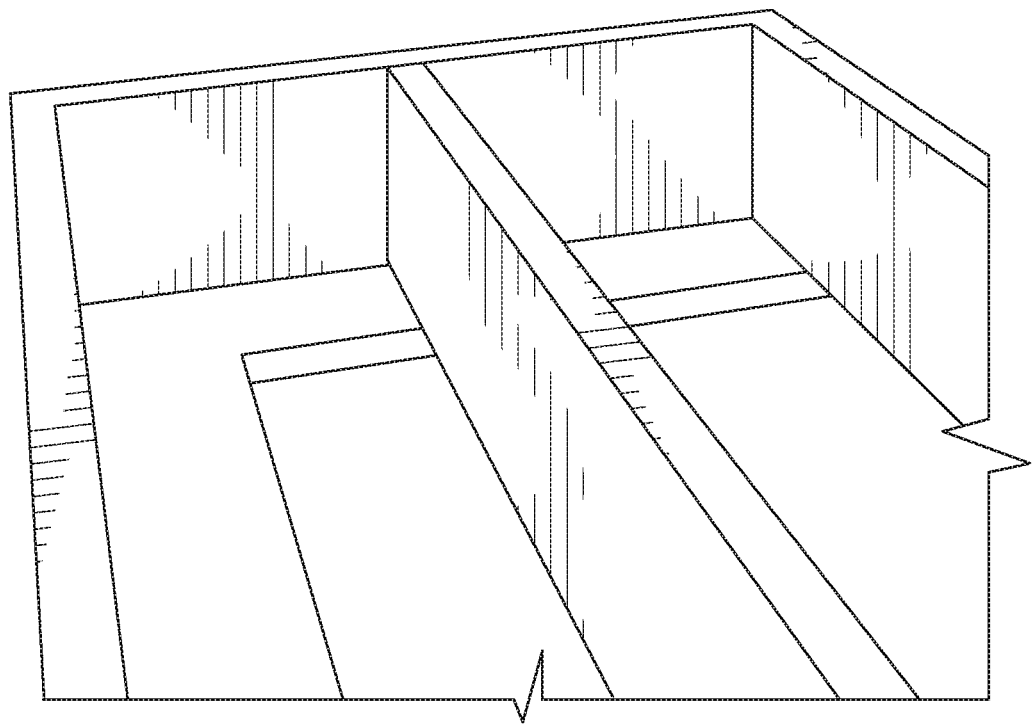
FIG. 1A is a perspective view of a prior art floor joist constructed of dimensional lumber.
Figure 1B:
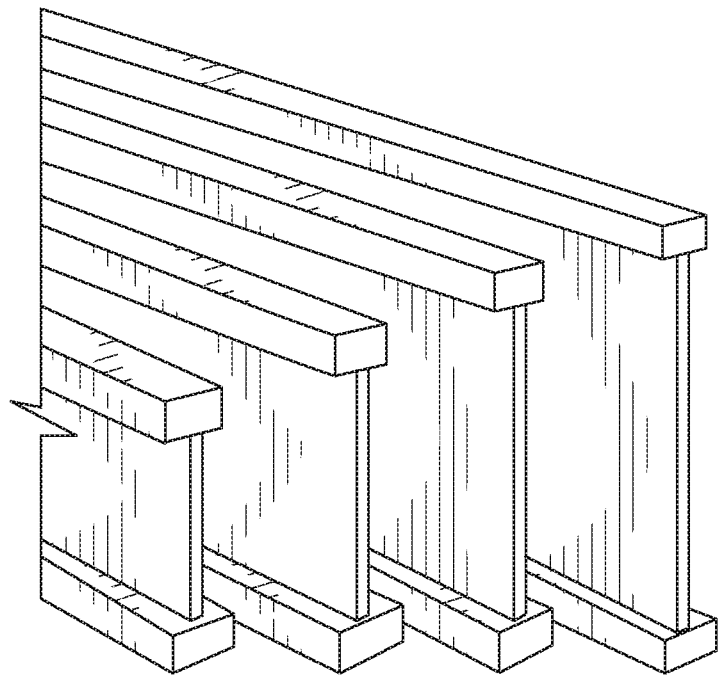
FIG. 1B is a perspective view of portions of prior art I-joist employed as a floor joist or truss.
Figure 1C:
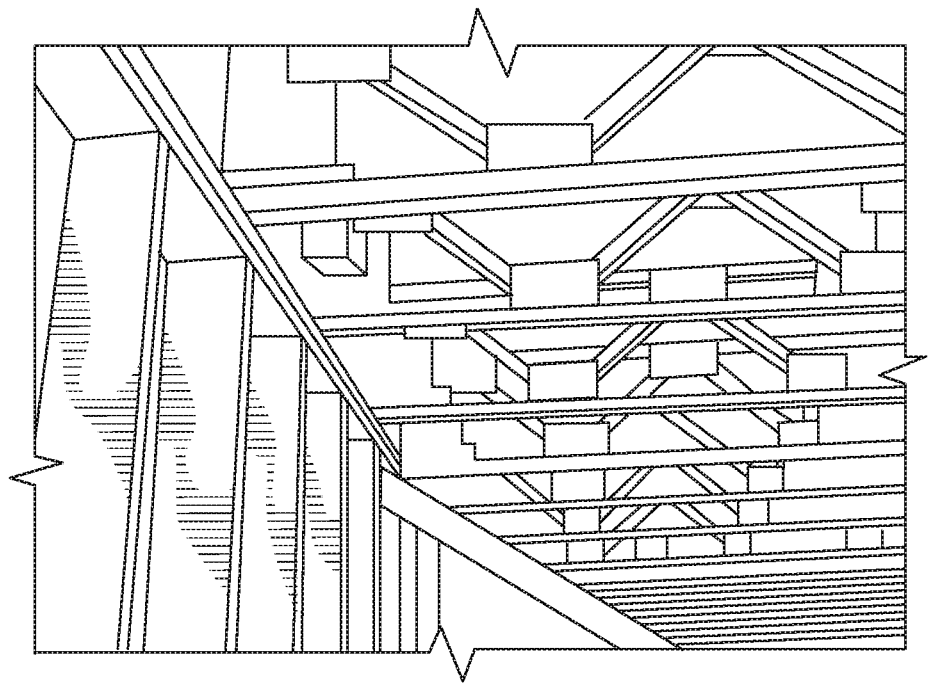
FIG. 1C is a perspective view of a prior art metal plated open web truss mounted in a pre-construction phase.
Figure 1D:
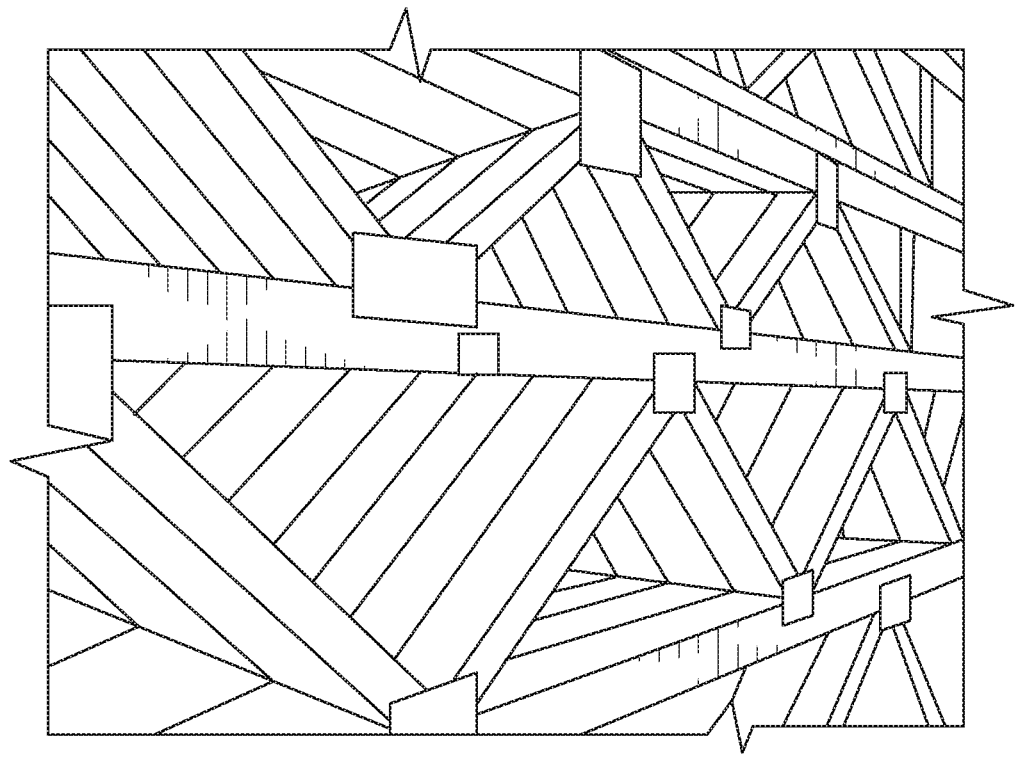
FIG. 1D is a perspective view of a stack of prior art open web trusses.

In one preferred form of the structural truss module as a roof truss or a floor joist, the structural truss module 10 functions as a ready replacement for a dimensional lumber-type floor joist as represented in FIG. 1A, an I-joist such as represented in FIG. 2B, or an open web roof or floor truss assembly such as represented in FIG. 1C. The features of the structural truss assembly allow for construction of the structural truss module as required and allow for efficiencies over a prior art representative load of stacked roof trusses, such as illustrated in FIG. 1D, by effectively replacing the latter with a compact load of wood chords and a pallet of fasteners, as will be described below.

With reference to FIGS. 2, 4, 5 and 9, a representative structural truss module 10 suitable for a truss is constructed from a pair of wood chords 20 and 22 which are joined by a web 30 comprising a matrix of metal fasteners 40. The chords may be 2×3, 2×4 or other structural lumber components having a desired length L. The fasteners 40 are dimensioned in accordance with the desired height H of the truss. For a given truss, the fasteners 40 are preferably identical although identical fasteners are not required. For a given truss module, the lengths L of the chords are preferably equal although equal lengths for chords 20 and 22 are not required. Alternatively, the chords need not be oriented in the 2× direction as illustrated, but may essentially assume a 3×2 or 4×2 orientation.

Figure 7:
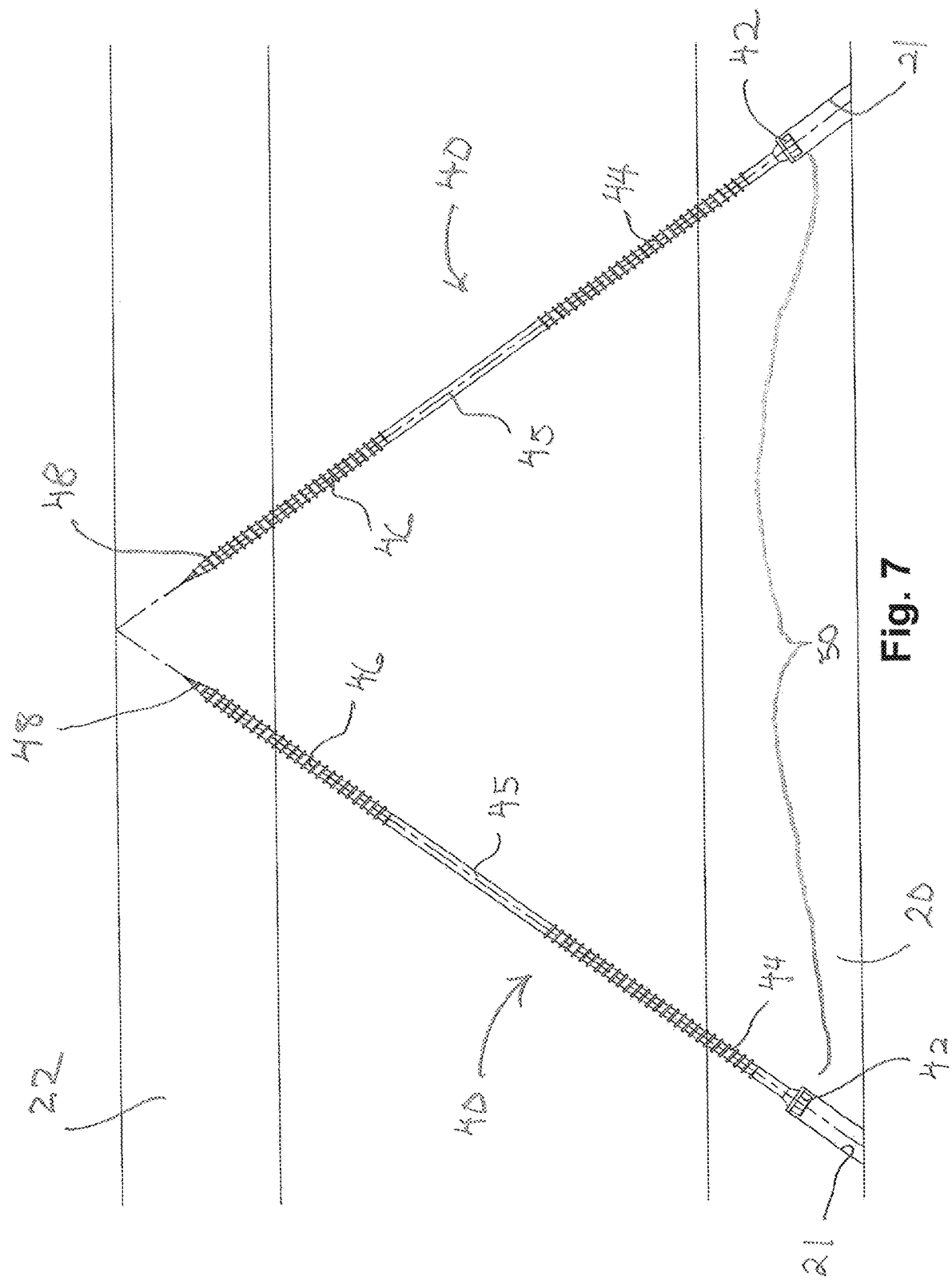
FIG. 7 is an enlarged fragmentary sectional view, partly in schematic, of a roof or floor truss module.

With reference to FIG. 7, the fasteners 40 are elongated screws having a head 42 for receiving a high drive torque, a first threaded port 44 generally adjacent the head, an unthreaded medial portion 45, a second threaded portion 46 adjacent the distal end, and a tip 48 which facilitates penetration into the wood chords. In one configuration, the fasteners 40 are oriented at an angle of approximately 45° to the chord 20, and are drilled from the bottom chord 20 to the top chord 22 at the pre-determined angle. Upon the final installation, the first threaded portion 44 threadably engages the lower chord 20 and the second threaded portion 46 threadably engages the upper chord 22. Naturally, the upper and lower designations are arbitrary. The thread tips 48 preferably terminate approximately one inch to one and a half inches below the upper edge of chord 22. In one manufacturing process, a pilot bore 21 is pre-formed in the chord 20 at the given angle for each fastener.

In certain embodiments, the fastener matrix comprises a series of fastener pairs 50. The fastener of each pair is oriented so that the central axes of the fasteners essentially intersect at the top edge 24 of chord 22 (FIG. 7). The fastener tips 48 never engage. It is desired that the head 42 be seated below the bottom edge 26 of chord 20 approximately at a one inch to a one and a half inch spacing from the edge. For a given chord, the spacing is preferably uniform.

Figure 2:
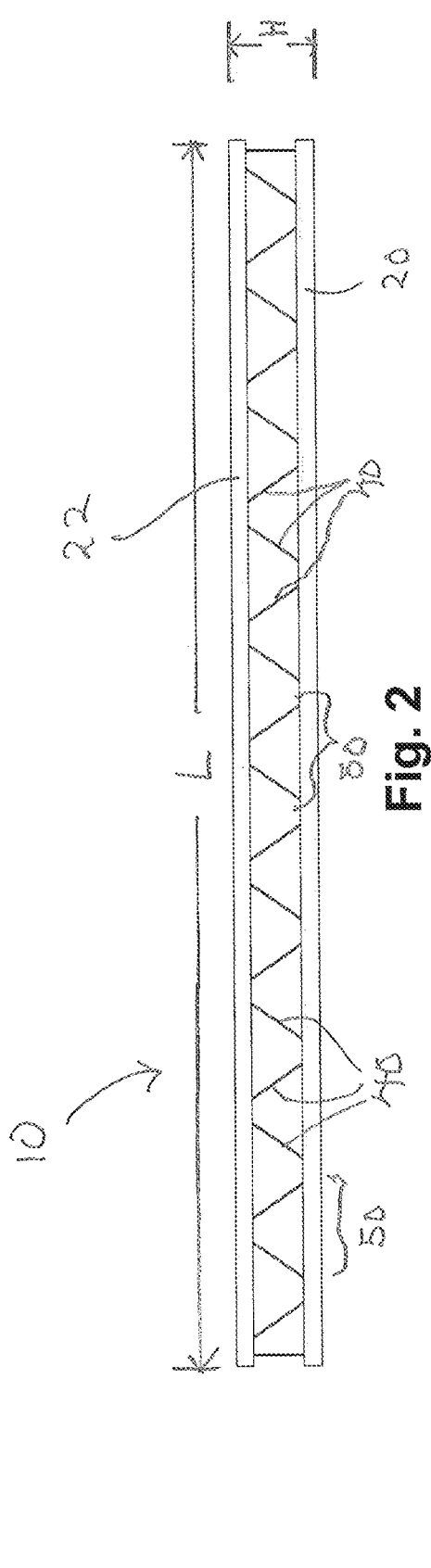
FIG. 2 is a diagrammatic side elevational view of one embodiment of a roof or floor truss module.
Figure 4:
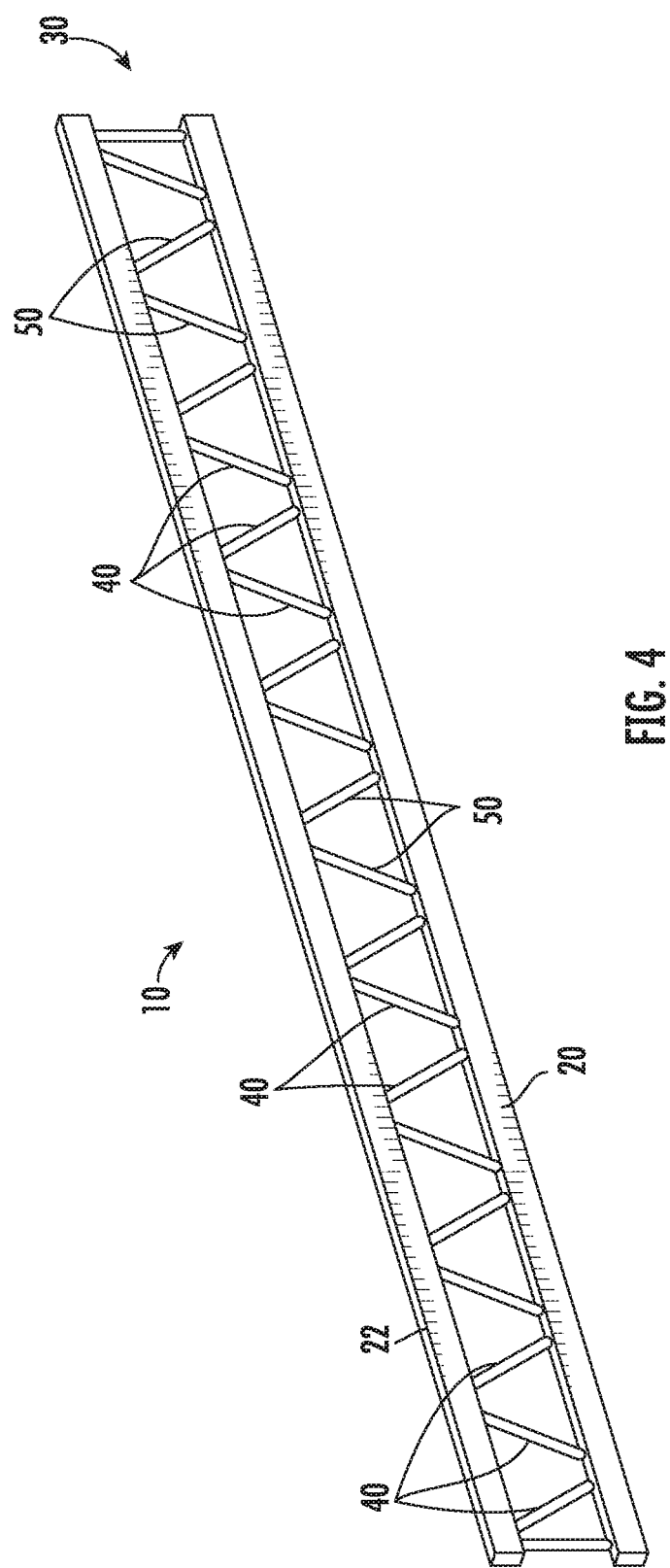
FIG. 4 is a perspective view of a roof or floor truss module.
Figure 5:
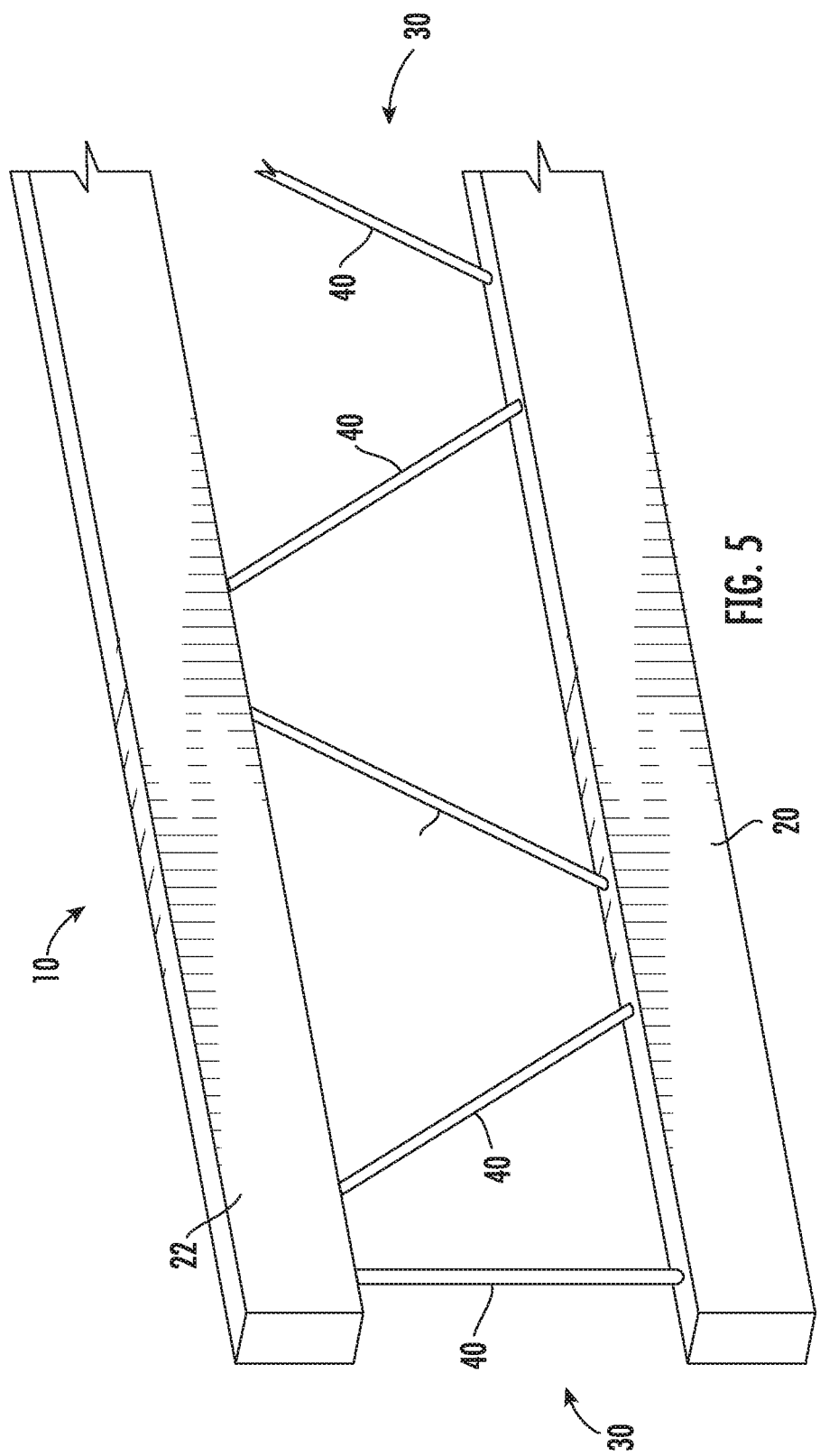
FIG. 5 is an enlarged fragmentary view of the roof or floor truss module of FIG. 4.
Figure 9:
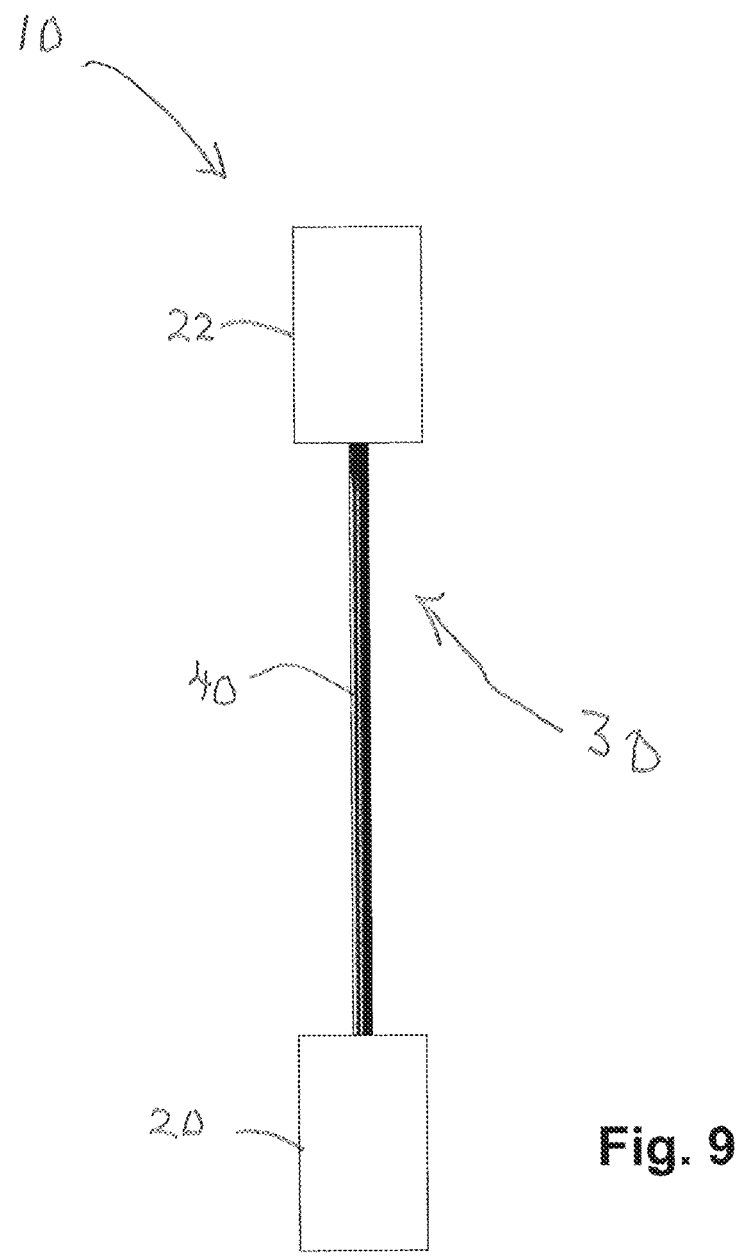
FIG. 9 is an enlarged end view of a roof or floor truss module.

As best represented in FIG. 9, the fasteners are driven and disposed on the center lines of the chords and generally transversely aligned along the length of the chord. In one configuration, as best illustrated in FIGS. 2 and 4, at the ends of the chords, one fastener 40 is driven at a vertical angle or 90° angle to the chords.

A representative manufacturing method for a representative structural truss module 510 is schematically illustrated in FIGS. 19A-19D. A jig assembly 500 employs a reference shoulder 502 and a plurality of jigs 504 for securing a first chord 522 at a fixed position. A second set of jigs 506 secure a substantially identical second chord 520 at an opposed second position equidistantly spaced from the first chord.

Multiple guides 508 are disposed in fixed position between the chords to provide the proper entry angle for the fasteners 540. In one embodiment, the guides 508 are angularly adjustable and adapted to be fixed at the selected angular position. A drill 515 or a series of drills 515 are activatable to drill a pilot bore in the bottom chord 520 at the given angles illustrated. It will be appreciated that some of the pilot bore formations are done sequentially because of the angular relationships of the pilot bores for the truss module 510.

As best illustrated in FIG. 19B, a first set of fasteners 540 is installed by a torque driver 517 driving the fasteners through the pilot bores at a first angle, and at a right angle on one end as illustrated so that the fasteners 540 are threadably engaged in the first chord 522 and threadably embedded in the second or bottom chord 520. The driving of the fasteners can be done concurrently. In a preferred embodiment, the head 542 of each fastener is driven into the chord 520 a pre-established distance from the edge 526. The end fasteners may have a shorter length than the fasteners driven at an angle. Fasteners 540 preferably have substantially the same geometry as fasteners 40.

Figure 19C:
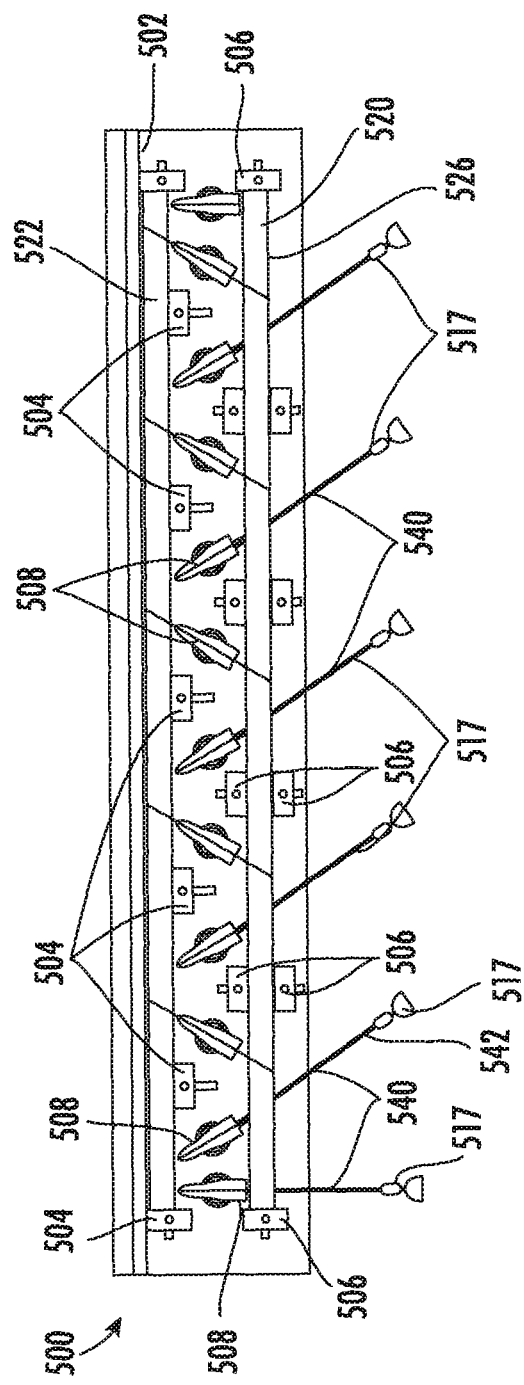

With reference to FIG. 19C, a second set of fasteners is then driven through the other pilot bores and the 90° pilot bore so that the head 542 of each fastener is embedded in the second chord and the fasteners threadably engage the first chord. Again, the driving of the second set of fasteners 540 may be accomplished concurrently.

Figure 19D:
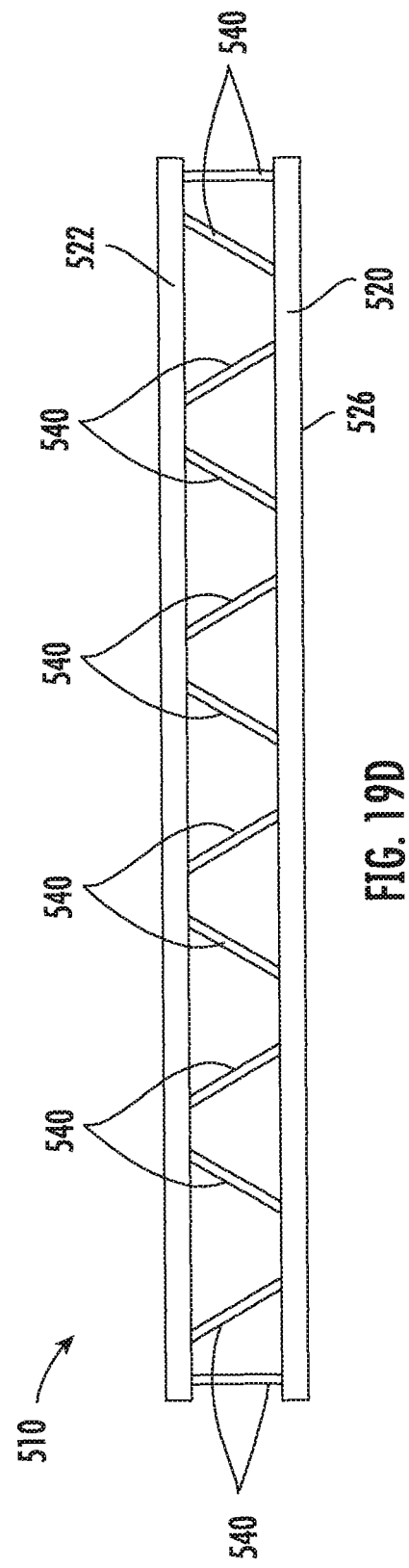

Once the second set of fasteners has been driven, the constructed truss module 510 is then removed from the jigs. The finished structural truss module 510 is illustrated in FIG. 19D.

Figure 8:
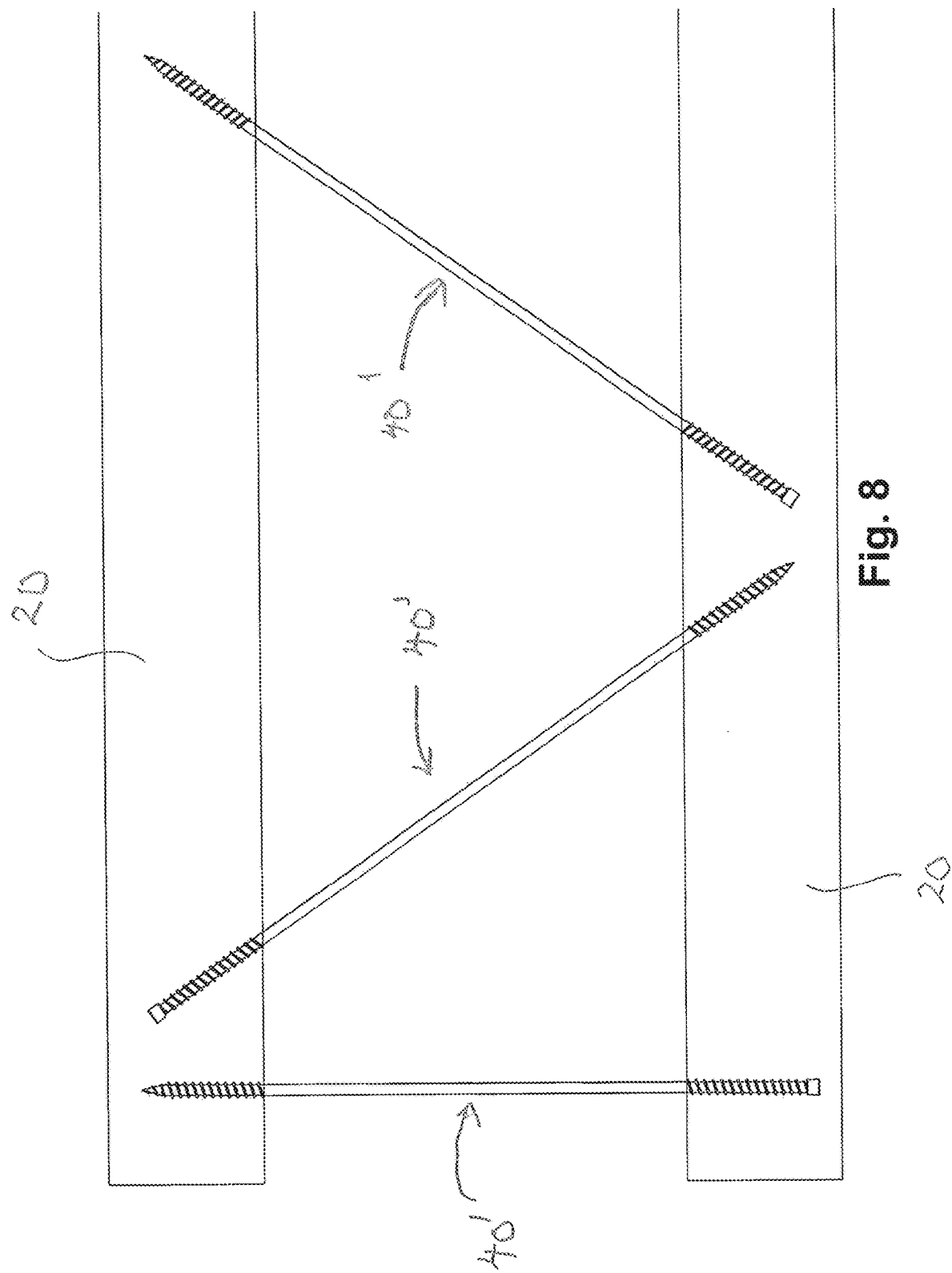
FIG. 8 is an enlarged fragmentary sectional view of a roof or floor truss module.
Figure 12:
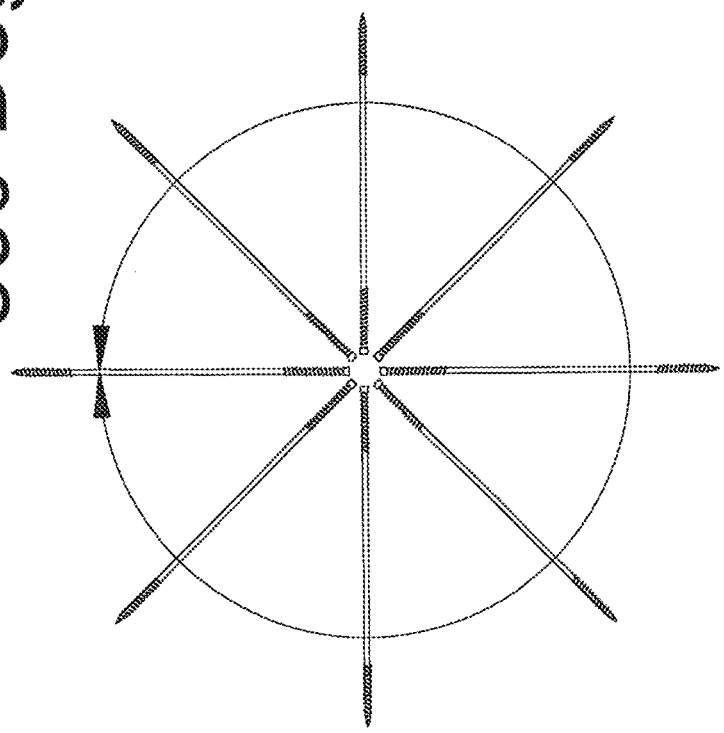
FIG. 12 is a schematic diagram illustrating the various possible fastener orientations for fasteners employed in various roof truss modules.

As best shown in FIG. 8, in one embodiment, the vertically oriented fastener is driven initially through the bottom edge 26. The next fastener in the web array is initially driven through the top edge 24 and the third fastener in the web array is initially driven through the bottom edge 26. Alternatively, the fasteners may be driven from the same edge or non-alternating edges. The fasteners may be driven at various angles and orientations relative to the chords, as schematically suggested in FIG. 12. Preferably, the web is formed by a series of angled quasi-convergent pairs 50 of fasteners.

Figure 11:
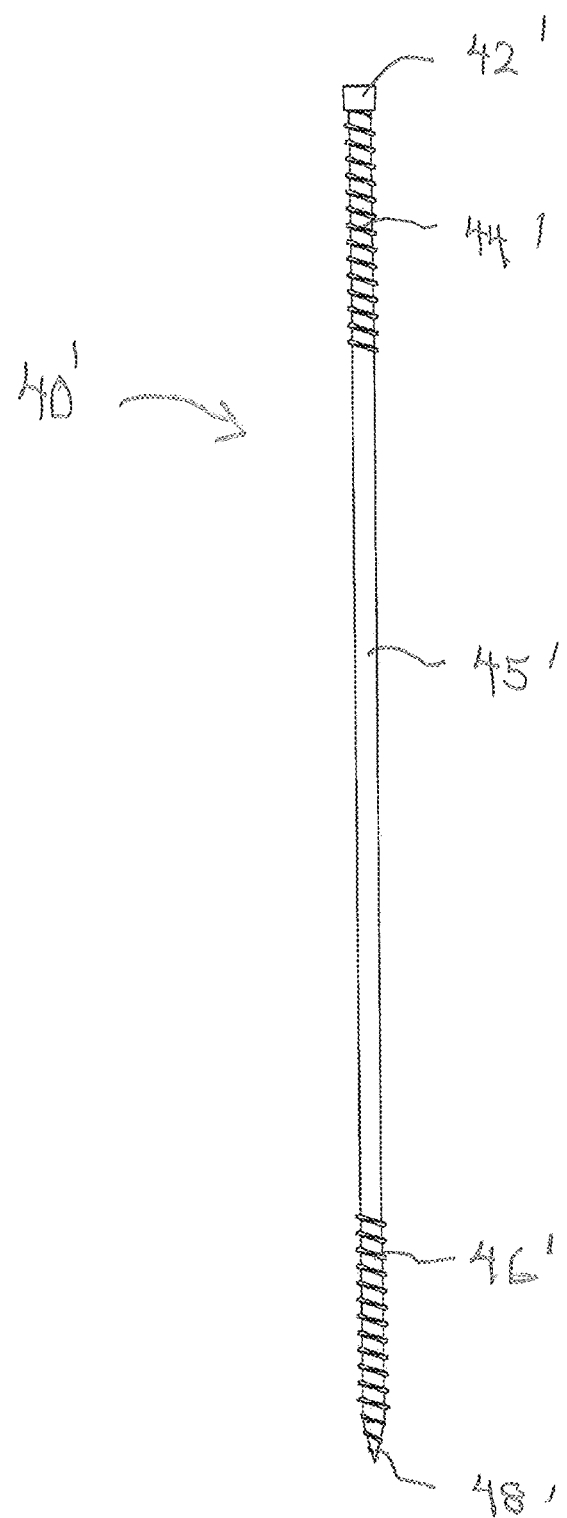
FIG. 11 is an enlarged side view of a fastener which may be employed in any of the roof or floor truss modules.

Another suitable fastener 40' is illustrated in FIG. 11 and comprises a drive head 42 which receives a drive torque, a threaded portion 44' adjacent the head and a second threaded portion 46' adjacent the distal end extending to the tip 48'. A medial portion 45' of substantial extent is not threaded. The unthreaded portion 45' extends a greater distance than that of portion 45, and the threaded portions 44' and 46' extend a smaller distance than threaded portions 44 and 46. Naturally, other fasteners may be employed. The fasteners for a given truss module need not be identical.

With reference to FIGS. 20A-20D, single, double, triple and quadruple representative structural truss module embodiments are shown as 610A, 610B, 610C and 610D, respectively. For structural truss module 610A, an array of single fasteners 640 is employed and the fasteners preferably connect the wood chords 620 and 622 along a medial transverse line l of the chords.

Structural truss module 6106 employs groups 651, 652, 653, 654 . . . of pairs of parallel fasteners 640 which are preferably equidistantly threaded into the chords 620 and 622 at locations which are equidistantly spaced from a longitudinal medial line l through the chords.

Structural truss module 610C employs groups 661, 662, 663, 664 . . . of three parallel fasteners 640. A medial set of the fasteners engages the chords 620 and 622 at spaced locations along a medial line l. A second set of the fasteners are equidistantly spaced from the medial line and longitudinally offset from the first set, as illustrated.

Figure 20A:
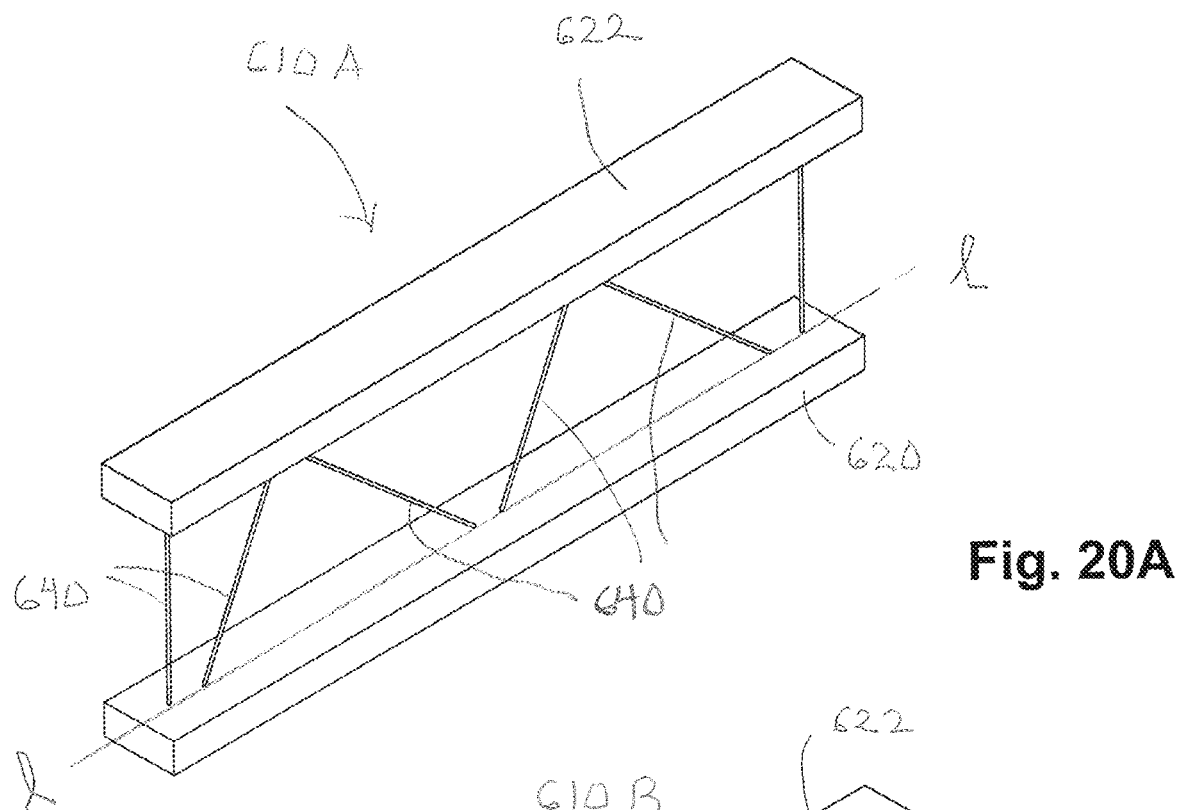
FIGS. 20A-20D are representative perspective views of structural truss modules with a single web configuration, a double web configuration, a triple web configuration and a quadruple web configuration, respectively.
Figure 20B:
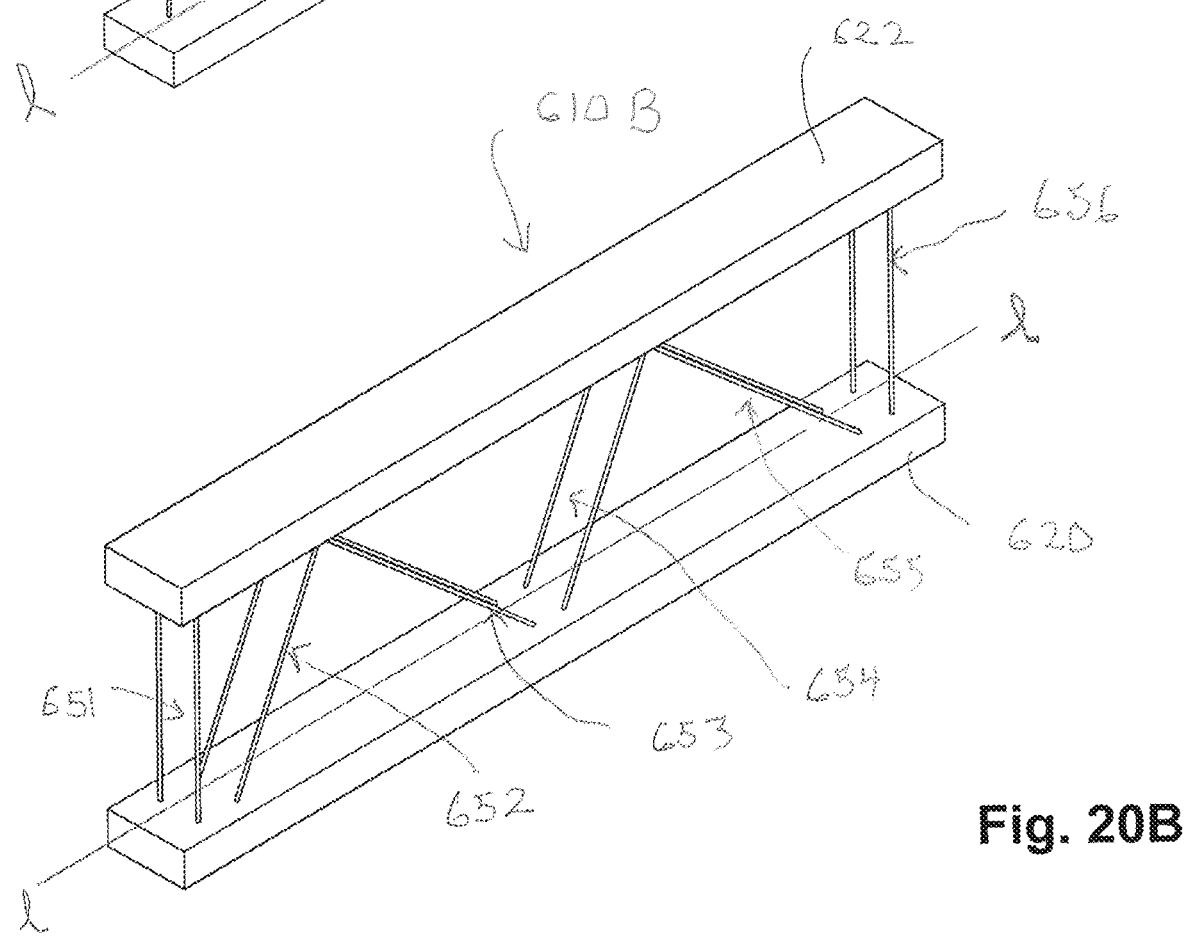
Figure 20C:
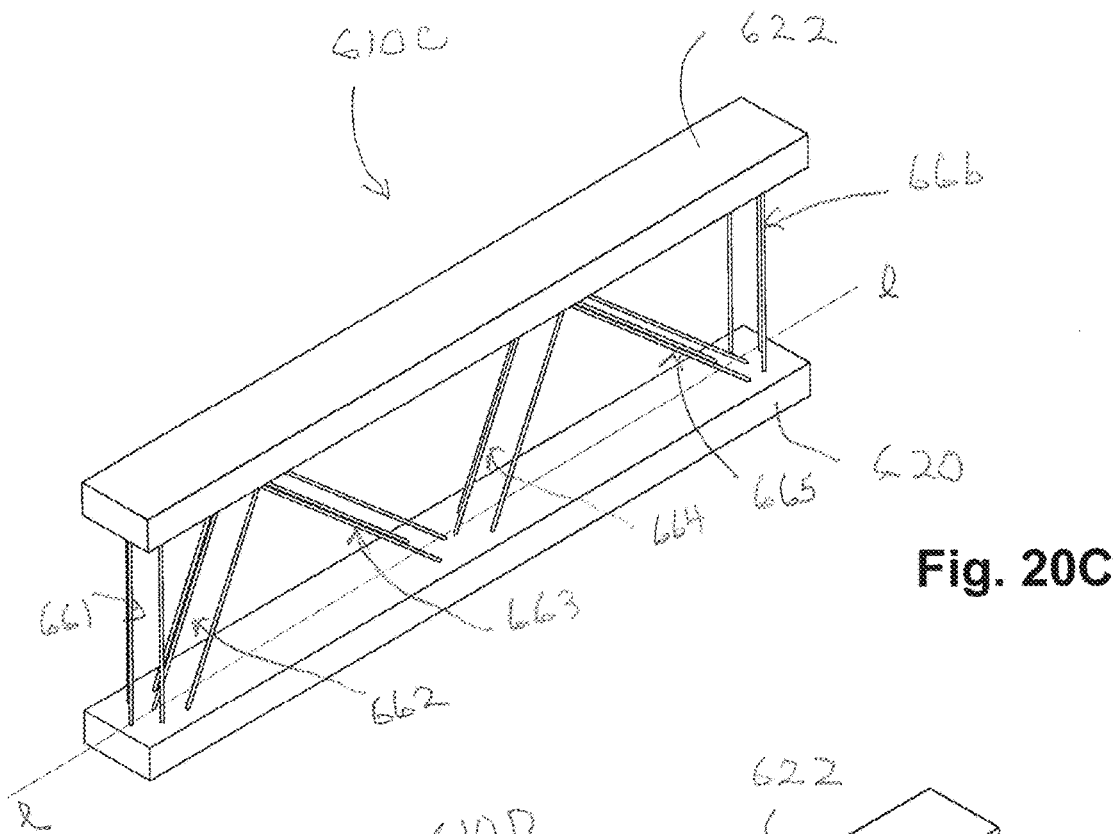
Figure 20D:
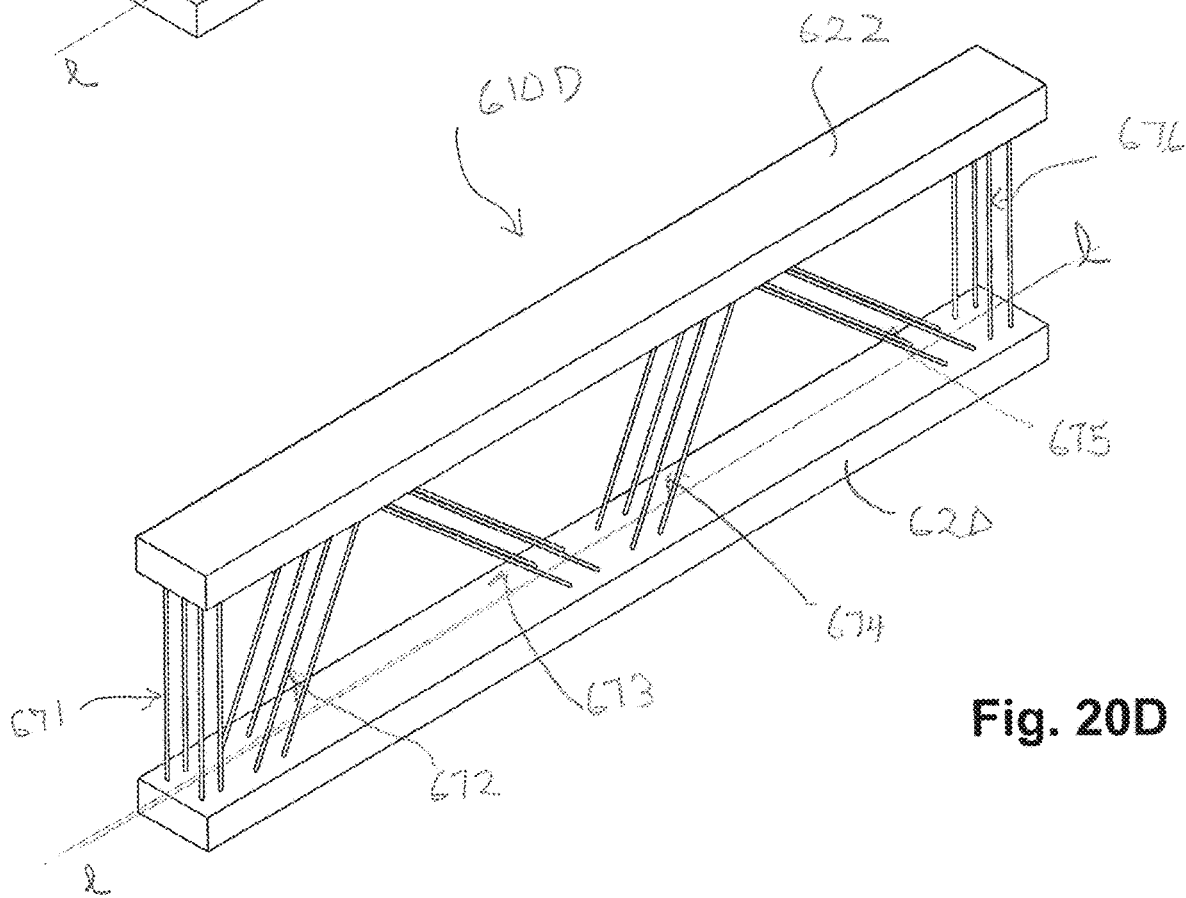

As illustrated in FIG. 20D, structural truss module 610D employs groups 671, 672, 673, 674 . . . of four fasteners 640. Each of the groups of fasteners preferably engages the chords equidistantly spaced from the medial line l of the chords.

It will be appreciated that other structural truss module configurations are possible and that it is possible for a given truss module to employ one or more groups of two, three, four or a single fastener in a given truss module to provide the requisite structural strength. The illustrated modules 610A, 610B, 610C and 610D are intended to be representative and typically are longer and have many more fastener groups than depicted. The fasteners 640 preferably have a geometry substantially similar to fasteners 40 or 40'.

The structural truss modules 10, 510, 610A and 610D have a number of features. Each module is relatively open and consequently provides enhanced space for accommodating mechanical and electrical systems. The metal fasteners combine to implement a construction which has a high degree of structural integrity. The structural truss modules 10 have superior fire damage characteristic by virtue of a favorable anti-burn rate since the web connection, which provides the principal support, is the last structure to be adversely impacted by fire.

The structural truss modules 10, 510, 610A and 610D have a very favorable weight and provide enhanced storage capabilities since the components are essentially the chords plus the fasteners, and the various extra weight and storage requirements for the additional wood components characteristic of conventional truss construction are not present.

The fastener web 30 construction is relatively straightforward and can be accomplished in an efficient custom manner which lends itself to essentially just-in-time construction. The fastener web structure provides a conducive structure for attaching the various electrical plumbing and mechanical components by plastic ties and other efficient low cost mounting hardware. The disclosed structural truss modules are also greener in the sense that the only wood required for the module is the chords. Finally, the structural truss modules have favorable cost characteristics because the fastening components are typically less expensive than the conventional wood/lumber support components. In addition, the manufacturing process is less labor intensive.

Figure 3:
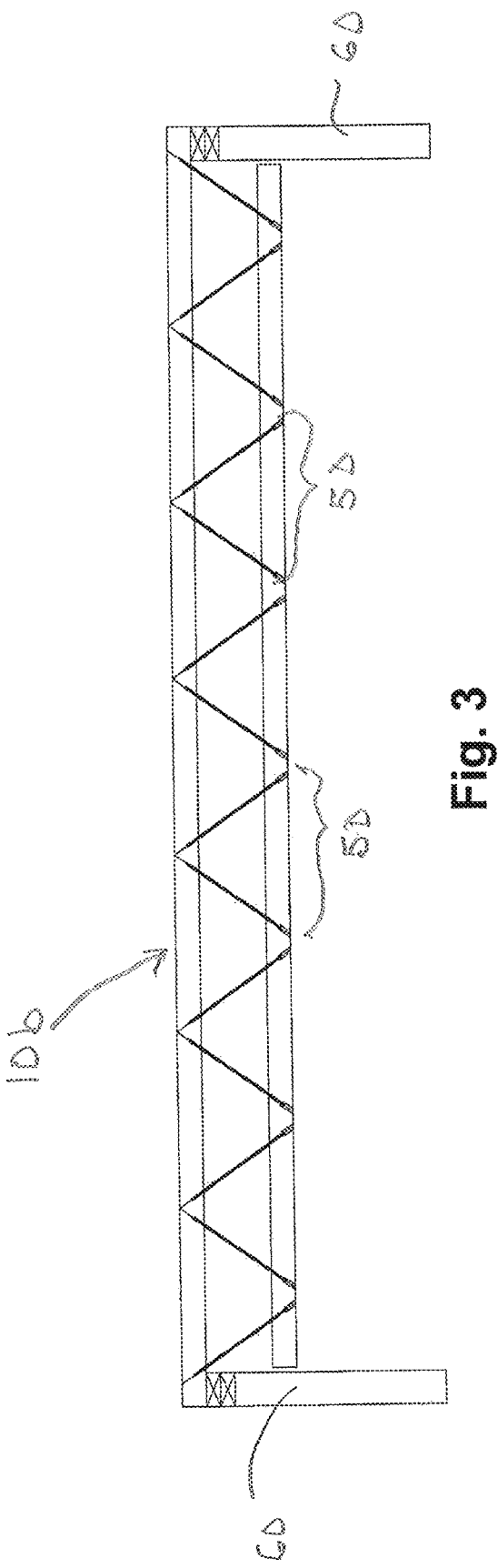
FIG. 3 is a side elevational view, partly in section, of a roof or floor truss module installed at a construction site.
Figure 6:
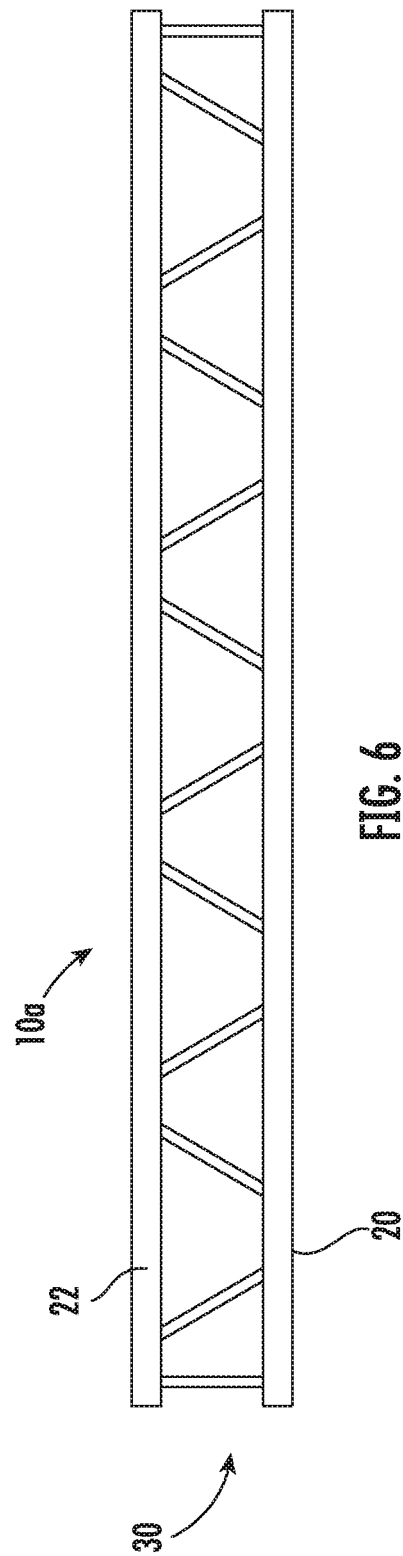
FIG. 6 is a side elevational view of another roof or floor truss module.

The structural truss components can be constructed in various lengths such as, for example, a smaller length for structural truss module 10a illustrated in FIG. 6, and in various configurations such as the flat truss 10b of FIG. 3 as mounted to support walls 60.

Figure 15:
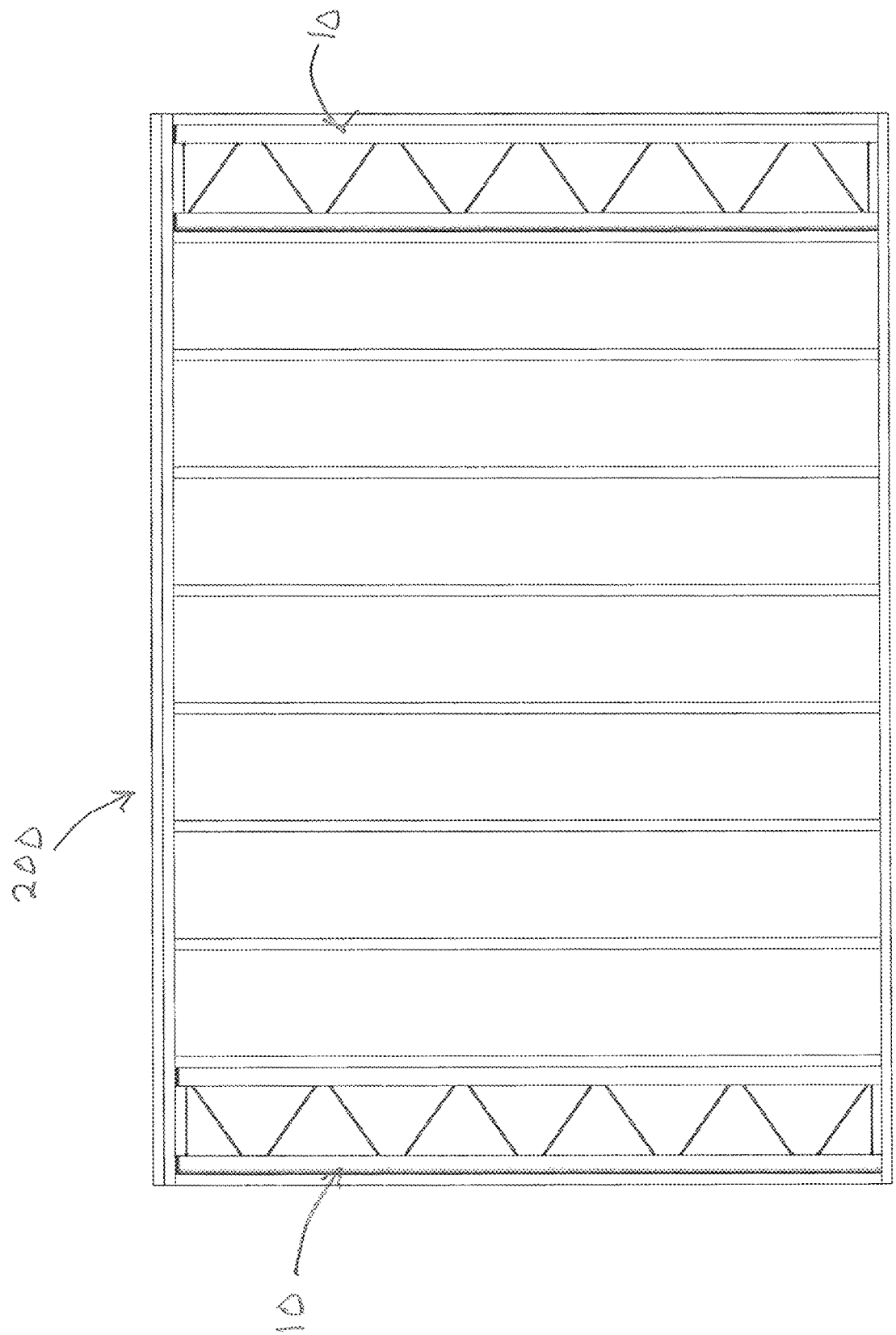
FIG. 15 is a side elevational view illustrating structural truss modules employed as vertical shear panels in a wall.
Figure 16:
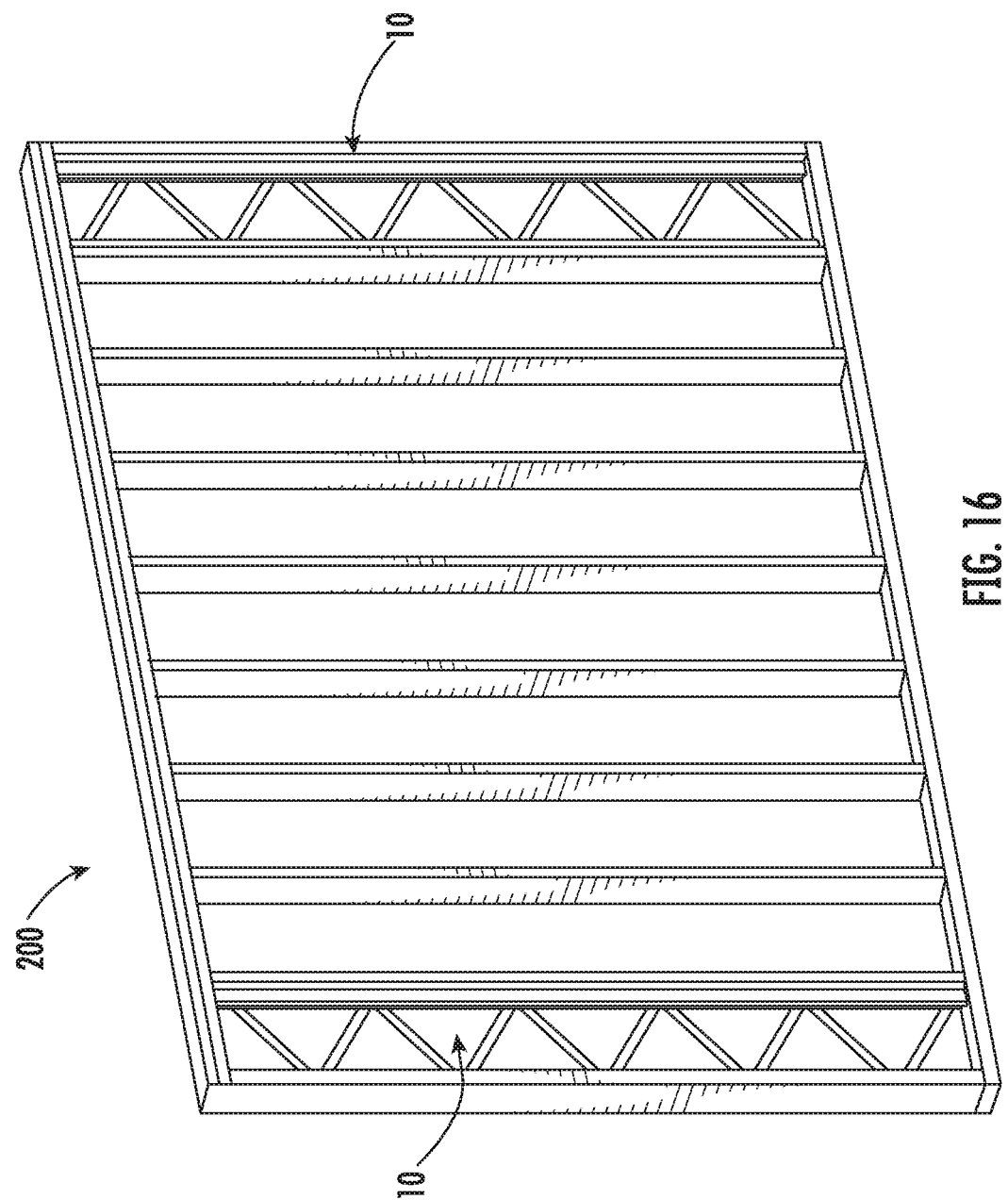
FIG. 16 is a perspective view of a wall incorporating shear panels comprising the structural truss modules of FIG. 15.

With reference to FIGS. 14-16, the structural truss modules 10 also have applicability as reinforcing panels for shear walls 200. In this context, the modules are oriented vertically. FIGS. 13A and 13B illustrate a prior art conventional shear wall which, upon subject to a lateral force, such as wood, tends to rotate. The incorporation of the structural truss modules reinforces the wall and tends to make the wall resistant to application of a lateral shear force and consequent rotation as illustrated in FIG. 13B. FIGS. 15 and 16 illustrate an alternative implementation of the structural truss module 10 to construct the shear wall 200.

Figure 17:
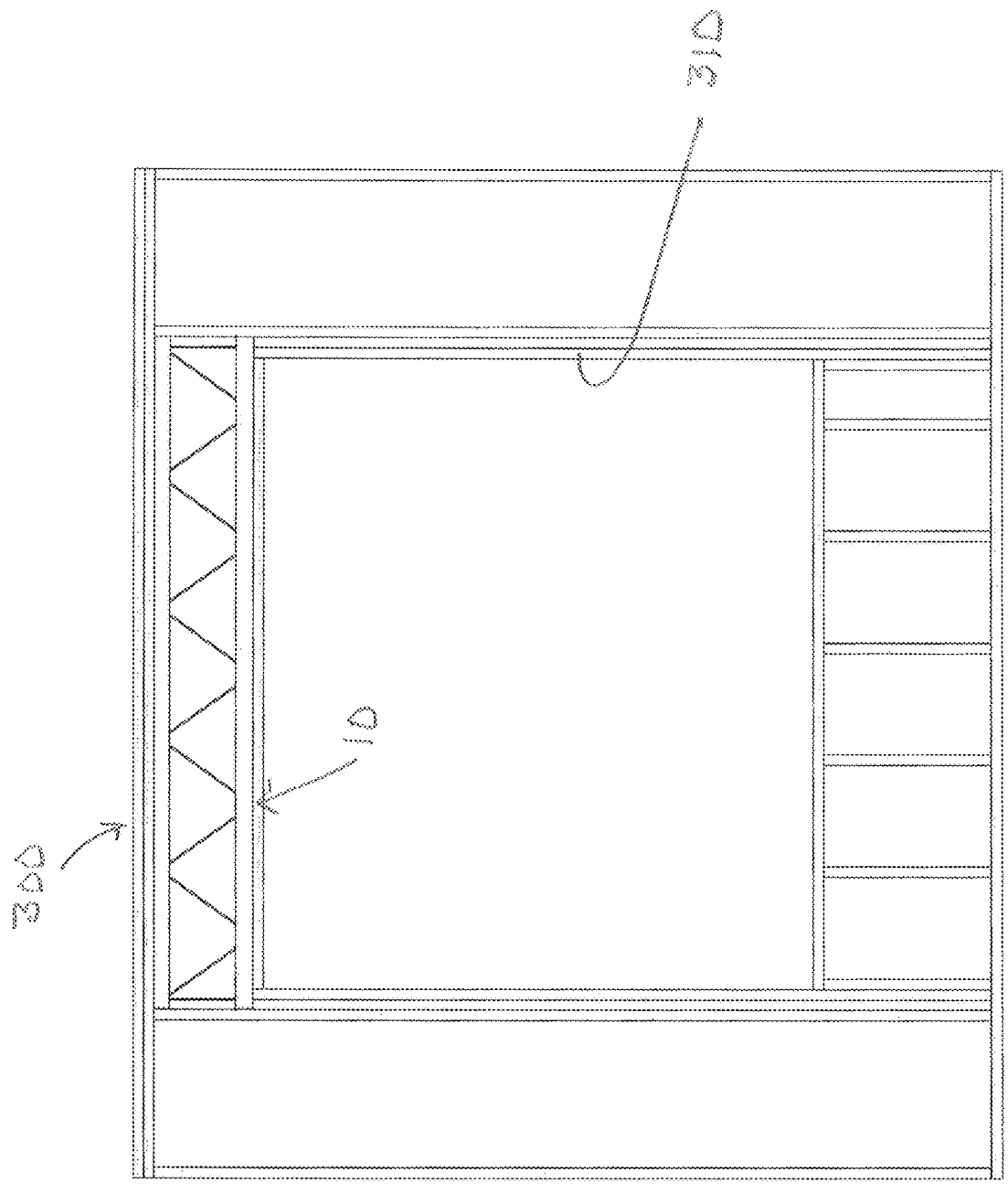
FIG. 17 is a side elevational view illustrating an installed header comprising a structural truss module with a web of fasteners.
Figure 18:
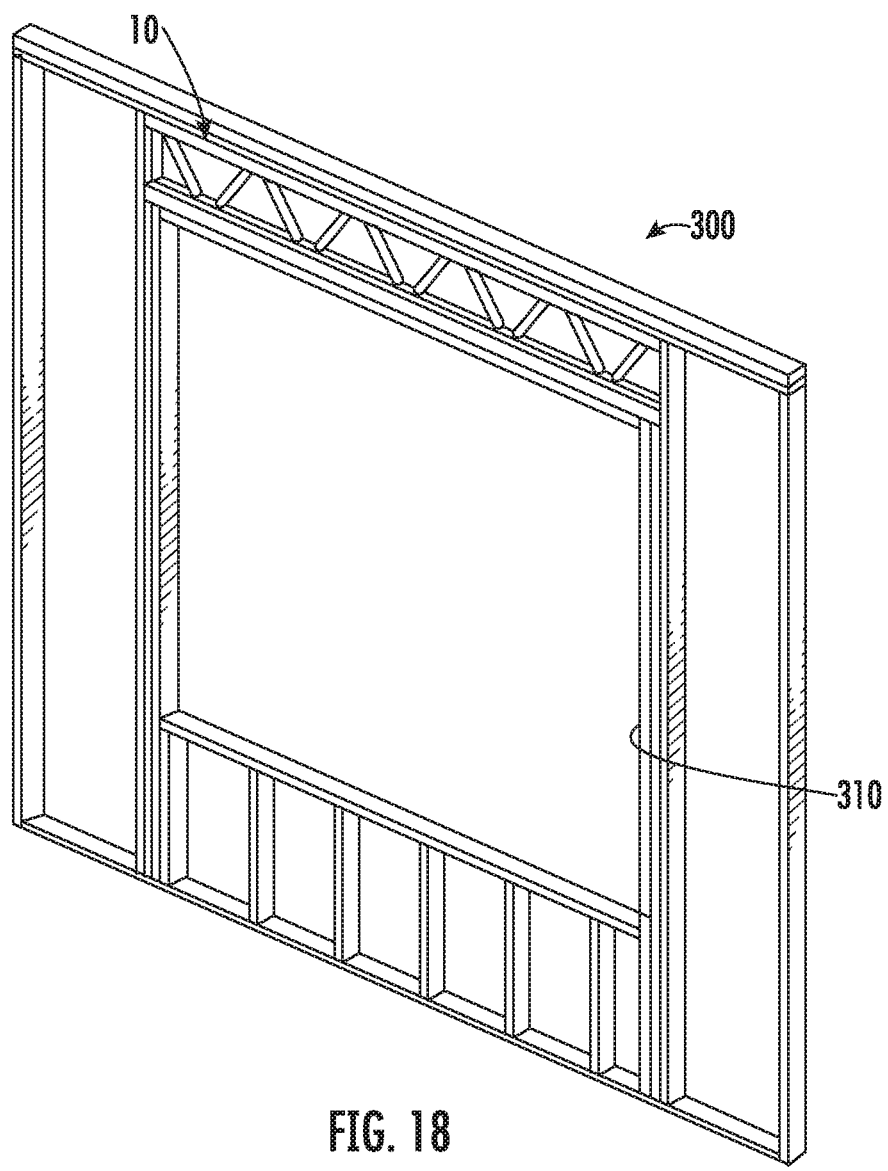
FIG. 18 is a perspective view of the header wall assembly of FIG. 17.

With reference to FIGS. 17 and 18, the structural truss module 10 also can be employed as a header over a window or doorway 310 or other structure for wall 300. In this regard, the module has a horizontal orientation. The construction of the module can be custom completed for a given construction application. Again, the header provides enhanced support. Due to its openness, the structural truss module 10 header provides improved thermal capabilities by enhancing the insulation and airtightness of the construction as a consequence of inserting insulation materials into the open structure of the module.

Naturally, truss modules 610A-610D may also be employed for support walls, shear walls and headers.

While preferred embodiments of the foregoing modules and integrated structures have been set for purposes of illustrating preferred embodiments, the foregoing description should not be deemed a limitation of the invention herein. Accordingly, various modifications, adaptations and alternatives may occur to one skilled in the art without departing from the spirit and the scope of the present invention.

The invention claimed is:

1. A structural truss module for use in assembling a structural building assembly, comprising
   a pair of generally parallel elongated support beams spaced from one another in a first direction, each of the support beams having a main monolithic body; and
   a web connecting said support beams, said web comprising a plurality of metal support rods each support rod having a pair of opposed threaded sections, a first of the pair of opposed threaded sections in a support rod threadedly embedded directly into the main monolithic body of a first of the opposed beams in a rigid connection at an oblique angle thereto and at an oblique angle to the first direction, and a second of the pair of opposed threaded sections in the same support rod threadedly embedded directly into the main monolithic body of a second of the opposed beams in a rigid connection at an oblique angle thereto and at an oblique angle to the first direction,
   wherein the support beams are configured to receive and support a load in substantially the first direction, and
   the truss module is configured to be assembled as a unit with tooling prior to being incorporated into a structural building assembly.

2. The structural truss module of claim 1 wherein each said beam has a transverse medial line and said rods generally engage each said beam along said medial line.

3. The structural truss module of claim 1 wherein said web defines a matrix of quasi-convergent adjacent pairs of support rods.

4. The structural truss module of claim 3 wherein each adjacent pair of support rods defines a substantially identical profile.

5. The structural truss module of claim 1 wherein said elongated support beams are selected from the group consisting of 2×3 wood chords, 2×4 wood chords and engineered wood components.

6. The structural truss module of claim 1 wherein each said metal support rod comprises an elongated screw having a head, a threaded portion adjacent said head, an intermediate unthreaded portion, a distal tip and a threaded portion adjacent said distal tip.

7. The structural truss module of claim 1 wherein each said metal support rod has a drive head which is embedded in a support beam and spaced from an edge of said support beam.

8. The structural truss module of claim 1 wherein the angle is 45°.

9. The structural truss module of claim 1 wherein each said fastener has a drive head and a tip, and each said head and tip is embedded in a chord a distance spaced from an outer edge of said chord.

10. The structural truss module of claim 9 wherein said distance is 1 inch to 1.5 inches.

11. The structural truss module of claim 1 comprising a plurality of quasi-convergent pairs of fasteners.

12. The structural truss module of claim 1, wherein said truss module is configured to be employed as a floor truss.

13. The structural truss module of claim 1, wherein the support rods are linear.

14. The structural truss module of claim 1, wherein the tooling comprises one or more jigs.

15. The structural truss module of claim 1, wherein a plurality of adjacent support rods are angled in opposite relative directions from one another, and a longitudinal spacing between at least one pair of adjacent support rods that are angled in opposite relative directions from one another is open.

16. The structural truss module of claim 1, wherein space between the elongated support beams in an area longitudinally between at least two adjacent support rods of the plurality of support rods comprises one or more of insulation materials and electrical hardware.

17. The structural truss module of claim 1, wherein a plurality of adjacent support rods are angled in opposite relative directions from one another, and space between the elongated support beams in an area longitudinally between each adjacent pair of the support rods that are angled in opposite relative directions from one another open.

18. A structural truss module comprising:
   a pair of generally parallel elongated wood chords extending in a longitudinal direction and being spaced from one another;
   a web connecting said chords, said web comprising a plurality of fasteners extending between the pair of chords, each fastener having two threaded sections spaced from one another, each fastener being threadably embedded directly into a first and a second of the wood chords at an oblique angle thereto and oblique to the longitudinal direction,
   wherein the wood chords are configured to receive and support a load in a direction different from the longitudinal direction, and
   the truss module is configured to be assembled as a unit with tooling prior to being incorporated into a structural building assembly.

19. The structural truss module of claim 18 wherein said web further comprises multiple groups of parallel fasteners.

20. The structural truss module of claim 19 wherein each said group of fasteners has two, three or four fasteners.

21. The structural truss module of claim 18, wherein the fasteners are linear.

22. The structural truss module of claim 18, wherein space between the wood chords in an area longitudinally between at least two adjacent fasteners of the plurality of fasteners is open.

23. The structural truss module of claim 18, wherein space between the wood chords in an area longitudinally between each adjacent pair of fasteners of the plurality of fasteners is open.

24. A structural truss module, comprising:
   a pair of generally parallel elongated wood chords extending in a longitudinal direction and being spaced apart from one another to define a spacing;
   a web connecting said chords to one another, said web comprising a plurality of fasteners each having a first threaded section threadably embedded directly into one of the wood chords at an oblique angle thereto and oblique to the longitudinal direction and a second threaded section threadably embedded directly into the other of the wood chords at an oblique angle thereto and oblique to the longitudinal direction, wherein the fasteners are configured to provide the spacing between the wood chords, the wood chords are configured to receive and support a load in a direction different from the longitudinal direction, and the truss module is configured to be assembled as a unit with tooling prior to being incorporated into a structural building assembly.

25. A structural truss module, comprising:

a pair of generally parallel elongated wood chords extending in a longitudinal direction and being spaced apart from one another to define a spacing;

a web connecting said chords to one another, said web comprising a plurality of fasteners each having a first threaded section and a second threaded section, each threaded section being threadably embedded directly into one of the wood chords at an oblique angle thereto and oblique to the longitudinal direction, wherein one or more of the plurality of fasteners has an outer surface positioned within the spacing that is not embedded in wood, the wood chords are configured to receive and support a load in a direction different from the longitudinal direction, and the truss module is configured to be assembled as a unit with tooling prior to being incorporated into a structural building assembly.

26. The structural truss module of claim 25, wherein each of the plurality of fasteners has an outer surface positioned within the spacing that is not embedded in wood.

27. A structural truss module, comprising two chords that are elongated, generally parallel to one another and made from wood, each chord extending in a longitudinal direction and being spaced apart from the other chord to define a spacing therebetween;

a web connecting said chords to one another, said web comprising a plurality of fasteners each having a first threaded section threaded directly into one of the chords at an oblique angle thereto and oblique to the longitudinal direction, and a second threaded section threaded directly into one of the chords at an oblique angle thereto and oblique to the longitudinal direction with a plurality of adjacent fasteners being angled in opposite relative directions from one another, wherein a longitudinal spacing between at least one pair of adjacent fasteners that are angled in opposite relative directions from one another is open, the wood chords are configured to receive and support a load in a direction different from the longitudinal direction, and the truss module is configured to be assembled as a unit with tooling prior to being incorporated into a structural building assembly.

28. The structural truss module of claim 27, wherein a longitudinal spacing between each pair of adjacent fasteners that are angled in opposite relative directions from one another is open.

29. A structural truss module, comprising two chords that are elongated, generally parallel to one another and made from wood, each chord extending in a longitudinal direction and being spaced apart from the other chord to define a spacing therebetween;

a web connecting said chords to one another, said web comprising a plurality of fasteners, each fastener being threaded directly into each of the chords at an oblique angle thereto and oblique to the longitudinal direction with a plurality of adjacent fasteners being angled in opposite relative directions from one another, wherein a longitudinal spacing between at least one pair of adjacent fasteners that are angled in opposite relative directions from one another is open, the wood chords are configured to receive and support a load in a direction different from the longitudinal direction, and the truss module is configured to be assembled as a unit with tooling prior to being incorporated into a structural building assembly.

30. A structural truss module, comprising:

a pair of generally parallel elongated wood chords extending in a longitudinal direction and being spaced apart from one another to define a spacing;

a web connecting said chords to one another, said web comprising a plurality of fasteners, each fastener being threadably embedded directly into a first of the pair of wood chords at an oblique angle thereto and oblique to the longitudinal direction and threadably embedded directly into a second of the pair of wood chords at an oblique angle thereto and oblique to the longitudinal direction, wherein the fasteners are configured to provide the spacing between the wood chords, the wood chords are configured to receive and support a load in a direction different from the longitudinal direction, and the truss module is configured to be assembled as a unit with tooling prior to being incorporated into a structural building assembly.

\* \* \* \* \*